(12) United States Patent
Mori et al.

(10) Patent No.: US 9,262,839 B2
(45) Date of Patent: Feb. 16, 2016

(54) IMAGE PROCESSING DEVICE AND IMAGE PROCESSING METHOD

(71) Applicant: SONY CORPORATION, Tokyo (JP)

(72) Inventors: Hironori Mori, Tokyo (JP); Katsuhisa Ito, Tokyo (JP); Kengo Hayasaka, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/320,833

(22) Filed: Jul. 1, 2014

(65) Prior Publication Data

US 2015/0016713 A1    Jan. 15, 2015

(30) Foreign Application Priority Data

Jul. 10, 2013 (JP) .................................. 2013-144504

(51) Int. Cl.
*G06K 9/00* (2006.01)
*G06T 7/20* (2006.01)
*G06T 7/00* (2006.01)

(52) U.S. Cl.
CPC ............. *G06T 7/2053* (2013.01); *G06T 7/0071* (2013.01); *G06T 2207/10016* (2013.01)

(58) Field of Classification Search
None
See application file for complete search history.

(56) References Cited

U.S. PATENT DOCUMENTS

| 2011/0110583 | A1* | 5/2011 | Zhang et al. | 382/154 |
| 2013/0101177 | A1* | 4/2013 | Yamada et al. | 382/107 |
| 2013/0322738 | A1* | 12/2013 | Oh et al. | 382/154 |
| 2014/0267616 | A1* | 9/2014 | Krig | 348/46 |

FOREIGN PATENT DOCUMENTS

| JP | 2000-261828 A | 9/2000 |
| JP | 2012-109788 A | 6/2012 |
| JP | 2013-019801 A | 1/2013 |

* cited by examiner

*Primary Examiner* — Sumati Lefkowitz
*Assistant Examiner* — David Perlman
(74) *Attorney, Agent, or Firm* — Sony Corporation

(57) ABSTRACT

There is provided an image processing device including a depth generation unit configured to generate, based on an image of a current frame and an image of a preceding frame of the current frame, a depth image indicating a position of a subject in a depth direction in the image of the preceding frame as a depth image of the current frame.

13 Claims, 18 Drawing Sheets

FIG. 16

| | REGION | MOTION | MAGNITUDE OF MOTION | PROCESS |
|---|---|---|---|---|
| FIRST EMBODIMENT | REGION OTHER THAN OCCLUSION REGION | NO MOTION | — | DEPTH VALUE OF PRECEDING FRAME IS USED |
| | OCCLUSION REGION | WITH MOTION | — | DEPTH VALUE IN UNITS OF SUB-PIXELS IS GENERATED |
| SECOND EMBODIMENT | REGION OTHER THAN OCCLUSION REGION | NO MOTION | — | DEPTH VALUE IN UNITS OF PIXELS IS GENERATED |
| | | WITH MOTION | — | DEPTH VALUE IN UNITS OF SUB-PIXELS IS GENERATED |
| | OCCLUSION REGION | | — | DEPTH VALUE OF PRECEDING FRAME IS USED |
| | | | — | DEPTH VALUE IS GENERATED IN SEARCHING RANGE WITH SIZE SMALLER THAN NORMAL SIZE |
| | | | — | DEPTH VALUE IS GENERATED IN SEARCHING RANGE WITH NORMAL SIZE |
| THIRD EMBODIMENT | REGION OTHER THAN OCCLUSION REGION | NO MOTION | — | DEPTH VALUE OF PRECEDING FRAME IS USED |
| | | WITH MOTION | SMALL MOTION (HIGH RELIABILITY) | DEPTH VALUE IS GENERATED IN SEARCHING RANGE WITH SIZE SMALLER THAN NORMAL SIZE |
| | | | LARGE MOTION (LOW RELIABILITY) | DEPTH VALUE IS GENERATED IN SEARCHING RANGE WITH NORMAL SIZE |
| | OCCLUSION REGION | — | — | DEPTH VALUE IS GENERATED IN SEARCHING RANGE WITH NORMAL SIZE |
| FOURTH EMBODIMENT | LARGE DIFFERENCE BETWEEN FRAMES | — | — | DEPTH VALUE IS GENERATED AT EACH FRAME |
| | SMALL DIFFERENCE BETWEEN FRAMES | — | — | DEPTH VALUE IS GENERATED ONCE EVERY 10 FRAMES |

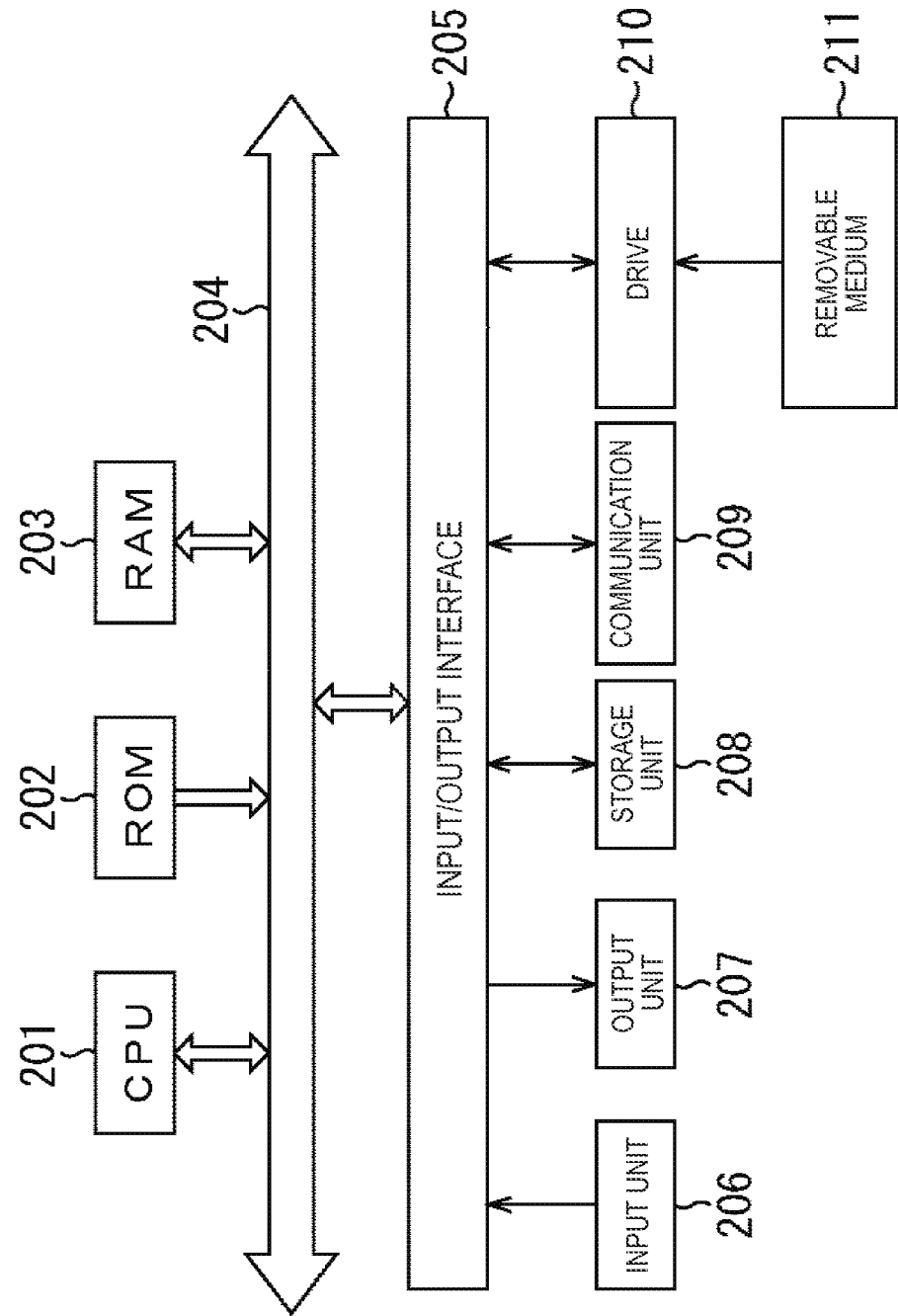

IMAGE PROCESSING DEVICE AND IMAGE PROCESSING METHOD

CROSS REFERENCE TO RELATED APPLICATIONS

This application claims the benefit of Japanese Priority Patent Application JP 2013-144504 filed Jul. 10, 2013, the entire contents of which are incorporated herein by reference.

BACKGROUND

The present disclosure relates to an image processing device and an image processing method, and more particularly, to an image processing device and an image processing method capable of rapidly generating a depth image using a depth image of a preceding frame.

Technologies for detecting motions of arms, hands, fingers, or the like of human beings through image recognition using depth images indicating the positions of subjects in depth directions in images generated using images of a plurality of viewpoints with high precision and using the motions as user interfaces of various applications have been suggested.

In such technologies, since a depth image with high precision is necessary, a position in a depth direction is desirably detected in units of sub-pixels smaller than units of pixels. As a method of detecting a position in a depth direction in the units of sub-pixels, for example, there is a method of increasing the resolution of an image of a plurality of viewpoints in a pseudo manner through linear interpolation or the like and detecting a position in a depth direction using the image of the plurality of viewpoints after the increase in the resolution.

There is also a method of interpolating positions in a depth direction in units of sub-pixels based on a function indicating a position detected in the units of pixels in the depth direction. There is also a method of detecting a position in a depth direction in the units of sub-pixels by a phase restriction correlation method (for example, see JP 2013-19801A).

However, when a position in a depth direction is detected in the units of sub-pixels, a calculation amount increases more than when the position in the depth direction is detected in the units of pixels. Accordingly, when detection of a position in a depth direction in the units of sub-pixels is performed on an entire screen, a detection time may increase and a depth image may not be generated at a high frame rate. Thus, in the above-described technology, it is difficult to use motions of arms, hands, fingers, or the like of human beings sufficiently as user interfaces.

On the other hand, methods of easily generating a depth image by setting the position of a subject in a depth direction in a region with a large motion vector as a front position and setting the position of the subject in the depth direction in a region with a small motion vector as a rear position using a motion vector have been suggested (for example, JP 2000-261828A and JP 2012-109788A).

SUMMARY

As described above, when detection of a position in a depth direction in the units of sub-pixels is performed on an entire screen, a detection time may increase. Accordingly, it is desirable to generate a depth image rapidly by not performing the detection of the position in the depth direction at least in a part of the screen.

It is desirable to provide a technology for generating a depth image rapidly using a depth image of a preceding frame.

According to an embodiment of the present disclosure, there is provided an image processing device including a depth generation unit configured to generate, based on an image of a current frame and an image of a preceding frame of the current frame, a depth image indicating a position of a subject in a depth direction in the image of the preceding frame as a depth image of the current frame.

An image processing method according to an embodiment of the present disclosure corresponds to the image processing device according to an embodiment of the present disclosure.

According to an embodiment of the present disclosure, based on an image of a current frame and an image of a preceding frame of the current frame, a depth image indicating a position of a subject in a depth direction in the image of the preceding frame is generated as a depth image of the current frame.

The image processing device according to an embodiment of the present disclosure can be realized by causing a computer to execute a program.

To realize the image processing device according to an embodiment of the present disclosure, the program caused to be executed by the computer can be transmitted via a transmission medium or recorded on a recording medium to be provided.

According to an embodiment of the present disclosure, it is possible to generate a depth image rapidly using a depth image of a preceding frame.

BRIEF DESCRIPTION OF THE DRAWINGS

FIG. 16 is a diagram illustrating a summary table of the processes of the first to fourth embodiments;

FIG. 19 is a block diagram illustrating an example of a hardware configuration of a computer.

DETAILED DESCRIPTION OF THE EMBODIMENT(S)

Figure 1:
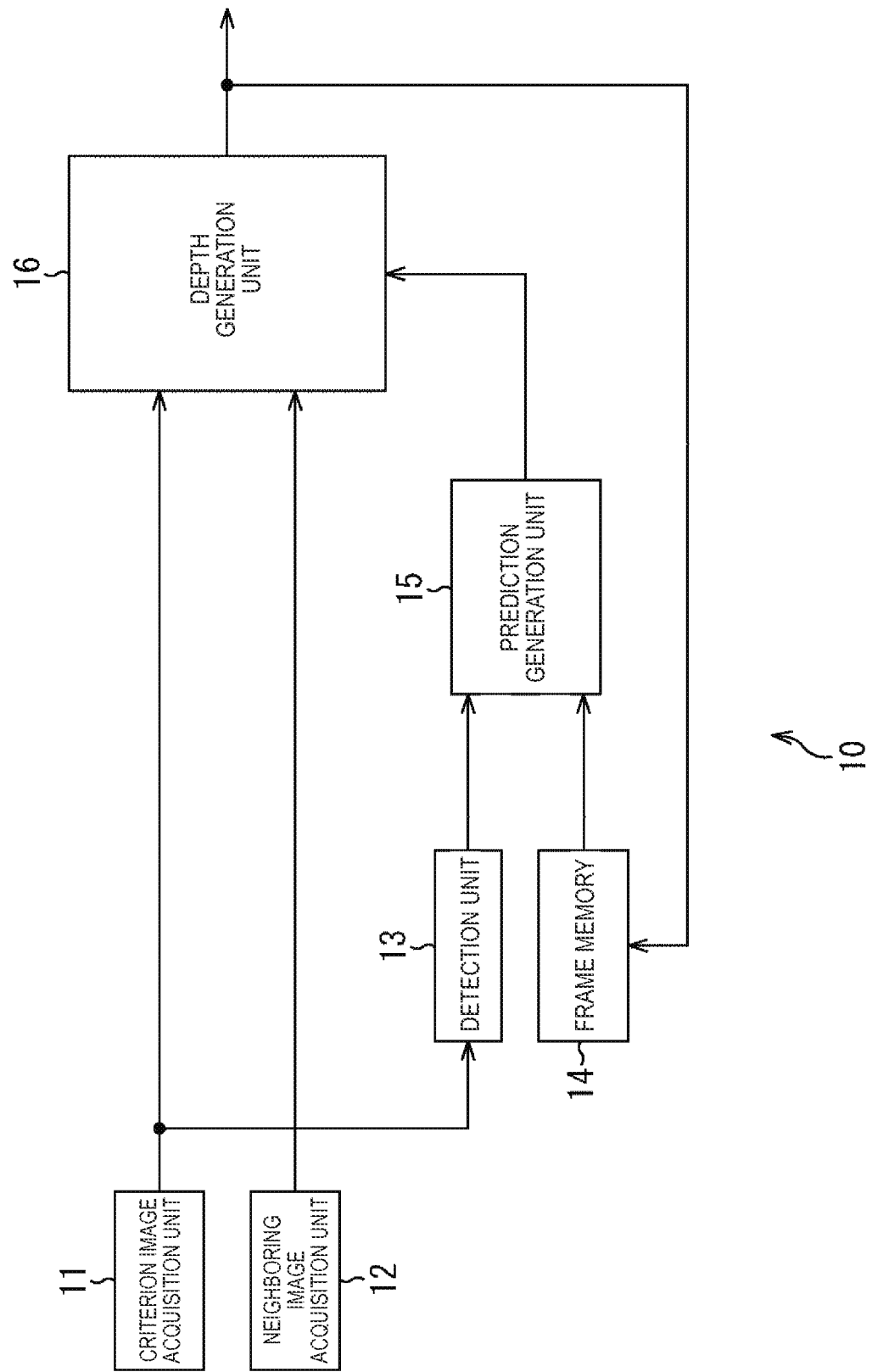
FIG. 1 is a block diagram illustrating an example of the configuration of an image processing device of a first embodiment to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<First Embodiment>

(Example of Configuration of Image Processing Device of First Embodiment to which the Present Disclosure is Applied)

FIG. 1 is a block diagram illustrating an example of the configuration of an image processing device of a first embodiment to which the present disclosure is applied.

An image processing device 10 in FIG. 1 includes a criterion image acquisition unit 11, a neighboring image acquisition unit 12, a detection unit 13, a frame memory 14, a prediction generation unit 15, and a depth generation unit 16. The image processing device 10 generates a depth image of a criterion viewpoint in units of sub-pixels which is one viewpoint serving as a criterion among viewpoints using images of the plurality of viewpoints.

Specifically, the criterion image acquisition unit 11 of the image processing device 10 acquires an image of the criterion viewpoint of a current frame. The criterion image acquisition unit 11 supplies the image of the criterion viewpoint of the current frame to the detection unit 13 and the depth generation unit 16.

The neighboring image acquisition unit 12 acquires an image of a neighboring viewpoint which is a viewpoint other than the criterion viewpoint of the current frame. In the present specification, to facilitate the description, the number of neighboring viewpoints is assumed to be 1, but may be plural. The neighboring image acquisition unit 12 supplies the image of the neighboring viewpoint of the current frame to the depth generation unit 16.

The detection unit 13 retains the image of the criterion viewpoint of the current frame supplied from the criterion image acquisition unit 11. The detection unit 13 detects a motion vector as information indicating a change between frames based on an image of the criterion viewpoint of a preceding frame, which is an immediately preceding frame of the current frame, and the image of the criterion viewpoint of the current frame. Specifically, the detection unit 13 detects a motion vector of each pixel of the retained image of the criterion viewpoint of the current frame based on the image of the criterion viewpoint of the preceding frame and the image of the criterion viewpoint of the current frame by a block matching method. The detection unit 13 supplies the motion vector to the prediction generation unit 15.

The frame memory 14 retains depth images of the criterion viewpoint in the units of sub-pixels supplied from the depth generation unit 16 by one frame. The frame memory 14 reads the retained depth image of the preceding frame in the units of sub-pixels and supplies the depth images to the prediction generation unit 15.

Based on the motion vector supplied from the detection unit 13, the prediction generation unit 15 sets a value obtained by moving a pixel value of each sub-pixel of the depth image of the preceding frame supplied from the frame memory 14 as a predicted value of the pixel value of each sub-pixel of the depth image of the criterion viewpoint of the current frame. Thus, the prediction generation unit 15 generates a predicted depth image with the predicted value of the pixel value of each sub-pixel of the depth image of the criterion viewpoint of the current frame.

In the predicted depth image generated in this way, an occlusion region, which is present in the image of the criterion viewpoint of the current frame but is not present in the image of the criterion viewpoint of the preceding frame, occurs. In the occlusion region of the predicted depth image, there is no pixel value. The prediction generation unit 15 supplies the predicted depth image and the motion vector to the depth generation unit 16.

The depth generation unit 16 generates, in units of pixels, a depth value indicating the position of a subject in a depth direction in the occlusion region in which there is no pixel value in the predicted depth image based on the image of the criterion viewpoint from the criterion image acquisition unit 11 and the image of the neighboring viewpoint from the neighboring image acquisition unit 12.

Specifically, the depth generation unit 16 sets, as a searching range with respect to each pixel of the occlusion region of the image of the criterion viewpoint, a predetermined range of the image of the neighboring viewpoint centering on the pixel. The depth generation unit 16 generates, as a depth value, a distance between each pixel of the occlusion region and a pixel which is the most similar to the pixel of the occlusion region within the searching range by matching each pixel of the occlusion region with the pixel within the searching range.

The depth generation unit 16 divides a region other than the occlusion region of the image of the criterion viewpoint into a region with motion and a region with no motion based on the motion vector supplied from the prediction generation unit 15. The depth generation unit 16 extracts the pixel value of the region with no motion in the units of sub-pixels from the predicted depth image and sets this pixel value as a depth value of the region with no motion in the units of sub-pixels.

The depth generation unit 16 extracts a pixel value of the region with motion in the units of sub-pixels from the predicted depth image and generates a depth value of the region with motion in the units of pixels based on this pixel value. The depth generation unit 16 generates a depth value in the units of sub-pixels through interpolation or the like based on the depth values of the region with motion and the occlusion region in the units of pixels.

The depth generation unit 16 generates a depth image in which the depth values of the region with no motion, the occlusion region, and the region with motion in the units of sub-pixels obtained in the above-described manner are set as the pixel values of the sub-pixels as a depth image of the criterion viewpoint of the current frame. The depth generation unit 16 outputs the depth image of the criterion viewpoint of the current frame and supplies the depth image to the frame memory 14.

(Generation of Predicted Depth Image)

Figure 2:
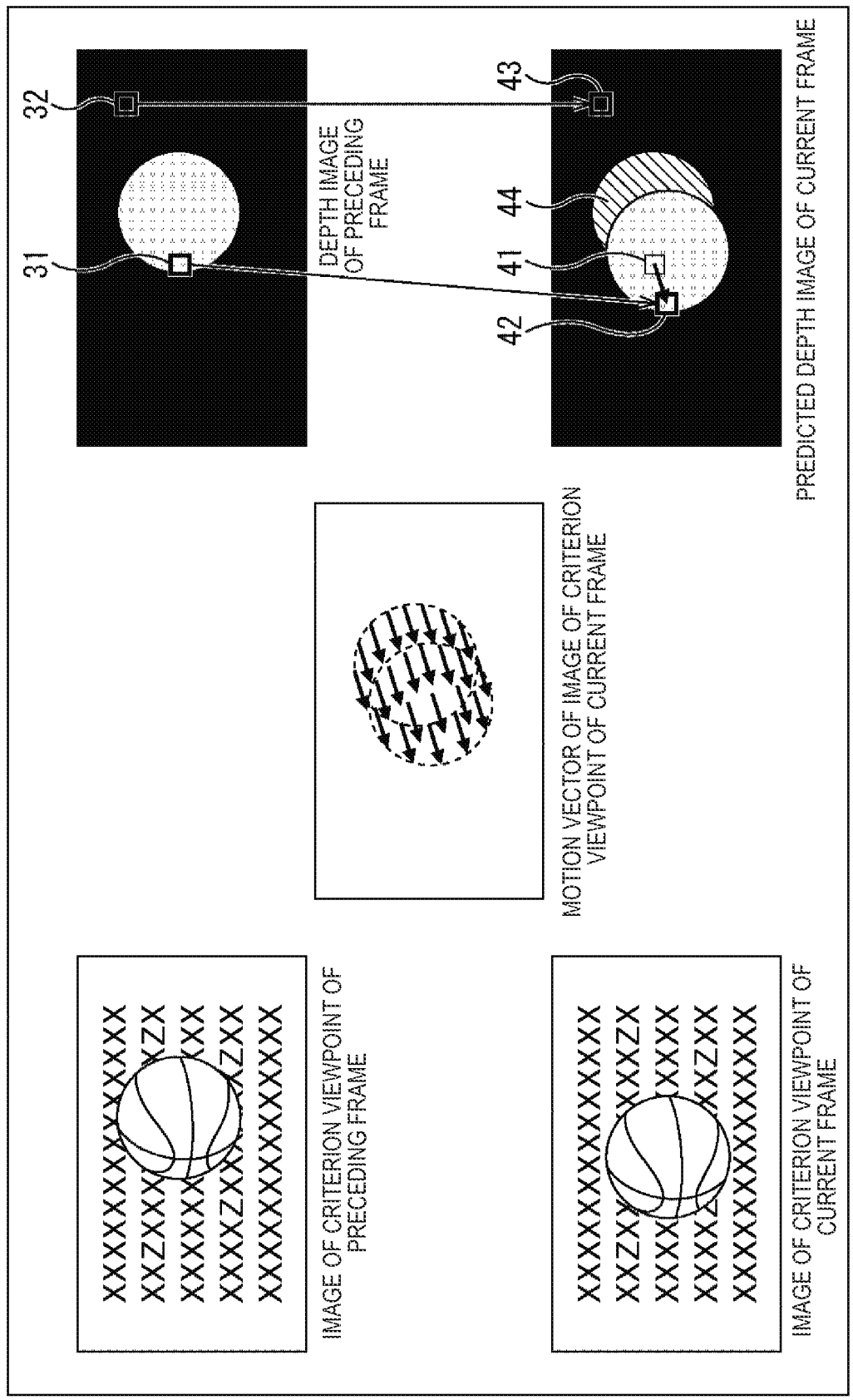
FIG. 2 is a diagram for describing generation of a prediction depth image by a prediction generation unit.

FIG. 2 is a diagram for describing generation of a predicted depth image by the prediction generation unit 15 in FIG. 1.

In an example of FIG. 2, an image of the criterion viewpoint is an image in which letters are a background and a basketball is a foreground. The basketball is present on the upper right side of a screen in the preceding frame and is present in the middle of a screen in the current frame. That is, between the preceding frame and the current frame, the basketball is moved to the lower left side.

In this case, a motion vector of each pixel of the criterion viewpoint of the current frame in a basketball region is a vector in which each self-pixel is oriented from the upper right to the lower left, as indicated by arrows in the middle of FIG. 2, and is 0 in a region other than the basketball region.

Accordingly, the prediction generation unit 15 moves the pixel value of a sub-pixel 31 in the basketball region of the depth image of the preceding frame to the lower left based on the motion vector. Then, the prediction generation unit 15 sets the pixel value of the sub-pixel 31 as the pixel value of a sub-pixel 42 which is located to the lower left of a sub-pixel 41 located at the same position of the sub-pixel 31 of the predicted depth image of the current frame. The same also applies to the other sub-pixels in the basketball region.

The prediction generation unit 15 sets a depth value of a sub-pixel 32 in the region other than the basketball region of the depth image of the preceding frame as the pixel value of a sub-pixel 43 located at the same position as the sub-pixel 32 of the predicted depth image of the current frame. The same also applies to the other sub-pixels in the region other than the basketball region.

As a result, pixel values of the predicted depth image are not generated in an occlusion region 44 which is the region other than the basketball region in the current frame but is the basketball region in the preceding frame.

(Description of Process of Image Processing Device)

Figure 3:
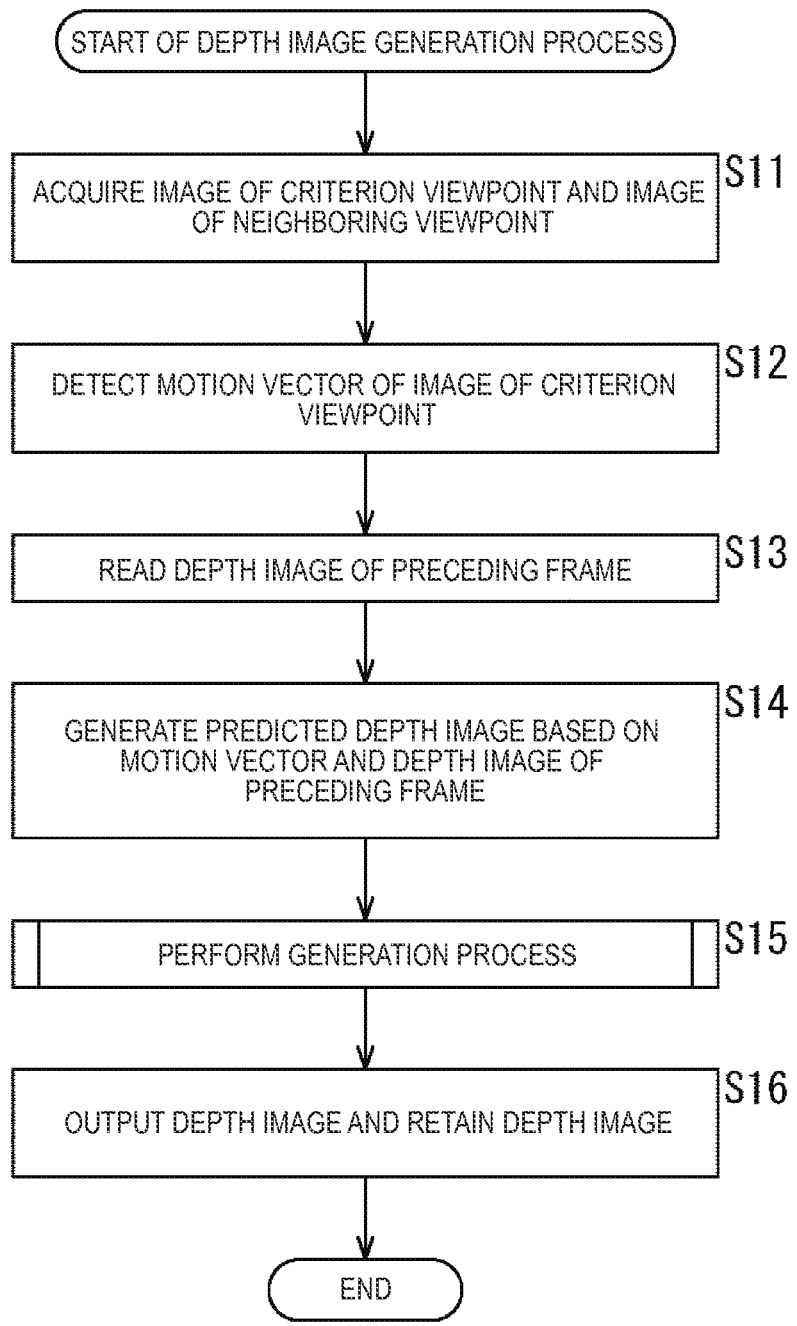
FIG. 3 is a flowchart for describing a depth image generation process of the image processing device in FIG. 1.

FIG. 3 is a flowchart for describing a depth image generation process of the image processing device 10 in FIG. 1.

In step S11 of FIG. 3, the criterion image acquisition unit 11 of the image processing device 10 acquires the image of the criterion viewpoint of the current frame and the neighboring image acquisition unit 12 acquires the image of the neighboring viewpoint of the current frame. The criterion image acquisition unit 11 supplies the image of the criterion viewpoint of the current frame to the detection unit 13 and retains the image of the criterion viewpoint, and supplies the image of the criterion viewpoint of the current frame to the depth generation unit 16. The neighboring image acquisition unit 12 supplies the image of the neighboring viewpoint of the current frame to the depth generation unit 16.

In step S12, the detection unit 13 compares the retained image of the criterion viewpoint of the preceding frame to the image of the criterion viewpoint of the current frame from the criterion image acquisition unit 11 and detects the motion vector of each pixel of the image of the criterion viewpoint of the current frame. The detection unit 13 supplies the motion vector to the prediction generation unit 15.

In step S13, the frame memory 14 reads the retained depth image of the criterion viewpoint of the preceding frame in the units of sub-pixels and supplies this depth image to the prediction generation unit 15.

In step S14, the prediction generation unit 15 generates the predicted depth image of the criterion viewpoint of the current frame, as described with reference to FIG. 2, based on the motion vector supplied from the detection unit 13 and the depth image of the preceding frame supplied from the frame memory 14. The prediction generation unit 15 supplies the predicted depth image and the motion vector to the depth generation unit 16.

In step S15, the depth generation unit 16 performs a generation process of generating the depth image of the criterion viewpoint of the current frame based on the predicted depth image. Details of the generation process will be described with reference to FIG. 4 to be described below.

In step S16, the depth generation unit 16 outputs the depth image of the criterion viewpoint of the current frame generated through the generation process, and supplies this depth image to the frame memory 14 and retains this depth image. Then, the process ends.

Figure 4:
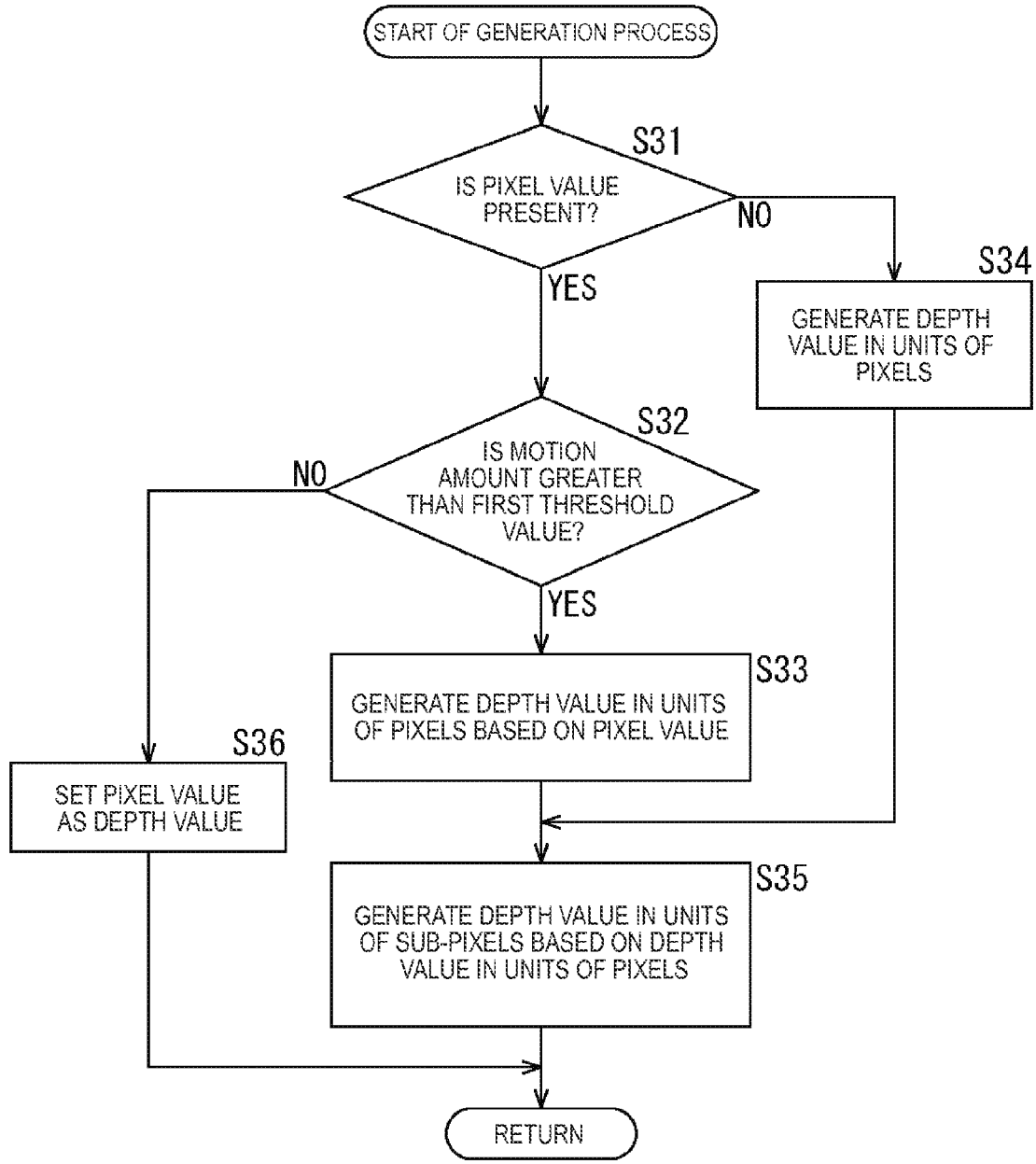
FIG. 4 is a flowchart for describing details of a generation process of FIG. 3.

FIG. 4 is a flowchart for describing the details of the generation process of step S15 of FIG. 3. The generation process is performed by setting each pixel of the image of the criterion viewpoint of the current frame as a processing target pixel.

In step S31 of FIG. 4, the depth generation unit 16 determines whether the pixel value of the processing target pixel is present in the predicted depth image supplied from the prediction generation unit 15. When it is determined in step S31 that the pixel value is present, that is, the processing target pixel is present outside of the occlusion region, the process proceeds to step S32.

In step S32, the depth generation unit 16 determines whether the motion amount of the motion vector of the processing target pixel supplied from the prediction generation unit 15 is greater than a first threshold value (for example, 0).

When the depth generation unit 16 determines in step S32 that the motion amount is greater than the first threshold value, the depth generation unit 16 determines that the processing target pixel is a pixel in the region with motion. Then, in step S33, the depth generation unit 16 extracts the pixel value of the processing target pixel in the units of sub-pixels from the predicted depth image and generates the depth value of the processing target pixel in the units of pixels based on the pixel value. Then, the process proceeds to step S35.

Conversely, when it is determined in step S31 that the present value is not present, that is, the processing target pixel is present in the occlusion region, the process proceeds to step S34.

In step S34, the depth generation unit 16 generates the depth value of the processing target pixel in the unit of pixels based on the image of the criterion viewpoint from the criterion image acquisition unit 11 and the image of the neighboring viewpoint from the neighboring image acquisition unit 12. Then, the process proceeds to step S35.

In step S35, the depth generation unit 16 generates the depth value in the units of sub-pixels through interpolation or the like based on the depth value in the units of pixels generated in step S33 or step S34. Then, the process returns to step S15 of FIG. 3 and the process proceeds to step S16.

Conversely, when the depth generation unit 16 determines in step S32 that the motion amount is equal to or less than the first threshold value, the depth generation unit 16 determines that the processing target pixel is a pixel of the region with no motion. Then, in step S36, the depth generation unit 16 extracts the pixel value of the processing target pixel in the units of sub-pixels from the predicted depth image and sets the pixel value as the depth value of the processing target pixel in the units of sub-pixels. Then, the process returns to step S15 of FIG. 3 and the process proceeds to step S16.

As described above, the image processing device 10 generates the depth value of the preceding frame in the region with no motion as the depth value of the current frame based on the image of the current frame and the image of the preceding frame. Accordingly, it is not necessary to generate the depth value in the region with no motion and the depth image can be generated rapidly.

The image processing device 10 generates the depth value of the current frame in the units of pixels based on the depth value of the preceding frame in the region with motion. Accordingly, it is not necessary to detect the depth value in the units of pixels in the region with a motion and the depth image can be generated more rapidly.

<Second Embodiment>

(Example of Configuration of Image Processing Device of Second Embodiment to which the Present Disclosure is Applied)

Figure 5:
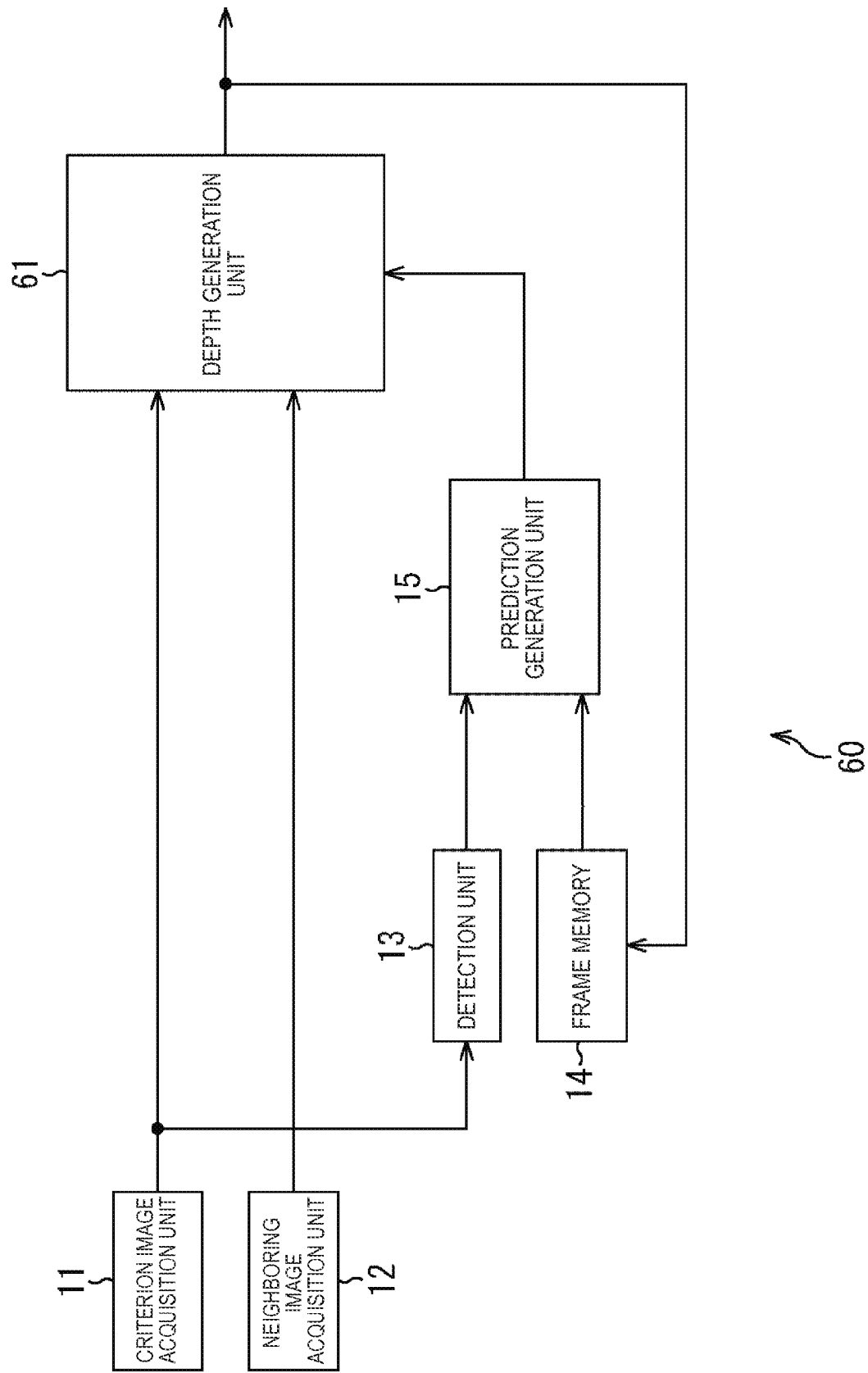
FIG. 5 is a block diagram illustrating an example of the configuration of an image processing device of a second embodiment to which the present disclosure is applied.

FIG. 5 is a block diagram illustrating an example of the configuration of an image processing device of a second embodiment to which the present technology is applied.

The same reference numerals are given to the constituent elements illustrated in FIG. 5 which are the same as those in FIG. 1. Repeated description will be properly omitted.

The configuration of an image processing device 60 in FIG. 5 is different from the configuration of the image processing device 10 in FIG. 1 in that a depth generation unit 61 is provided instead of the depth generation unit 16. The image processing device 60 does not generate the depth value of the current frame in the units of pixels in the region with motion from the depth value of the preceding frame, but restricts the searching range based on the depth value of the preceding frame.

Specifically, as in the depth generation unit 16, a depth generation unit 61 of the image processing device 60 generates a depth value of an occlusion region in units of pixels based on an image of a criterion viewpoint and an image of a neighboring viewpoint. As in the depth generation unit 16, the depth generation unit 61 divides a region other than the occlusion region of the image of the criterion viewpoint into a region with motion and a region with no motion based on a motion vector.

The depth generation unit 61 extracts the pixel value of the region with motion in units of sub-pixels from a predicted depth image. The depth generation unit 61 sets, as a searching range with respect to each pixel of the region with motion, a range with a size smaller than a normal size which is the size of a searching range of the image of the neighboring viewpoint with respect to the occlusion region based on a predicted value of the pixel. The depth generation unit 61 generates, as a depth value, a distance between each pixel of the region with motion and a pixel which is the most similar to the pixel of the region with motion within the searching range by matching each pixel of the region with motion with the pixel within the searching range.

The depth generation unit 61 generates a depth value in the units of sub-pixels through interpolation or the like based on the depth values of the region with motion and the occlusion region in the units of pixels. As in the depth generation unit 16, the depth generation unit 61 extracts a pixel value of the region with no motion in the units of sub-pixels from the predicted depth image and sets this pixel value as a depth value of the region with no motion in the units of sub-pixels.

The depth generation unit 61 generates a depth image in which the depth values of the region with no motion, the occlusion region, and the region with motion in the units of sub-pixels obtained in the above-described manner are set as the pixel values of the sub-pixels as a depth image of the criterion viewpoint of the current frame. The depth generation unit 61 outputs the depth image of the criterion viewpoint of the current frame and supplies the depth image to the frame memory 14.

(Description of Searching Range)

Figure 6:
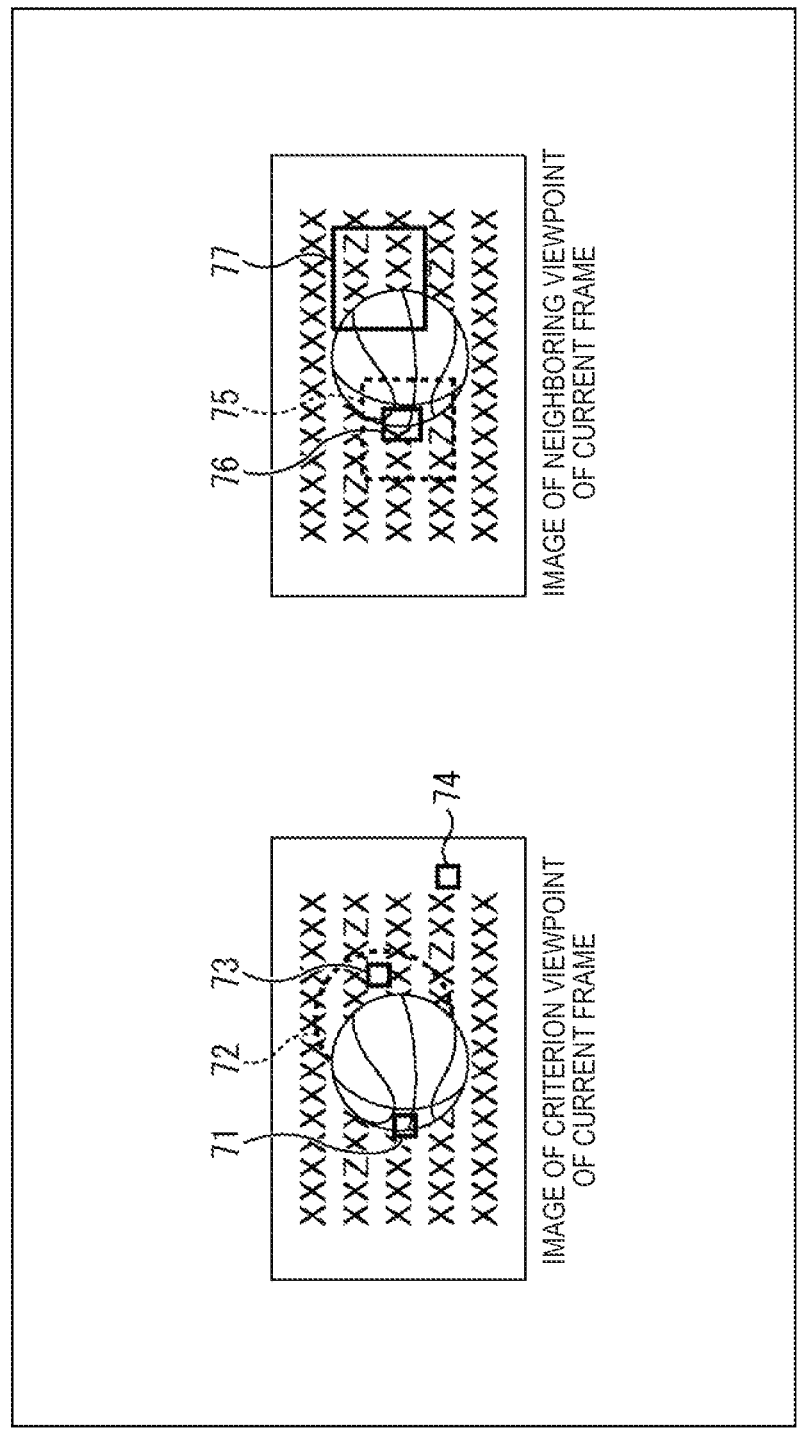
FIG. 6 is a diagram for describing a searching range set by a depth generation unit in FIG. 5.

FIG. 6 is a diagram for describing a searching range set by the depth generation unit 61 in FIG. 5.

In the example of FIG. 6, the images of the criterion viewpoint and the neighboring viewpoint are images in which letters are a background and a basketball is a foreground. The basketball is present on the upper right side of a screen in the preceding frame and is present in the middle of a screen in the current frame. That is, between the preceding frame and the current frame, the basketball is moved to the lower left side.

In this case, the region of the basketball in the image of the current frame is a region with motion. As a searching range of a pixel 71 within the region with motion, a range 75 with a normal size of the image of a neighboring viewpoint centering on the pixel 71 is not set, but a range 76 with a size smaller than the normal size based on the pixel value of the pixel 71 is set. The range 76 is, for example, a range with a size smaller than a normal size centering on the position of the pixel 71 separated from the pixel 71 in the horizontal direction by a distance corresponding to a predicted value of the pixel 71.

A region which is a region other than the region of the basketball in the current frame and which is a region of the basketball in the preceding frame is an occlusion region 72. A searching range of a pixel 73 of the occlusion region 72 is a range 77 with a normal size of the image of the neighboring viewpoint centering on the pixel 73.

A searching range of a pixel 74 within a region which is a region other than the basketball region of both of the current frame and the preceding frame is not set and a depth value of the pixel 74 is not generated since a motion vector of the pixel 74 is 0. The depth value of the pixel 74 is considered to be the pixel value of a sub-pixel located at the same position as the pixel 74 of the predicted depth image of the current frame.

(Description of Process of Image Processing Device)

A depth image generation process of the image processing device 60 in FIG. 5 is the same as the depth image generation process in FIG. 3 except for a generation process of step S15. Thus, only the generation process will be described below.

Figure 7:
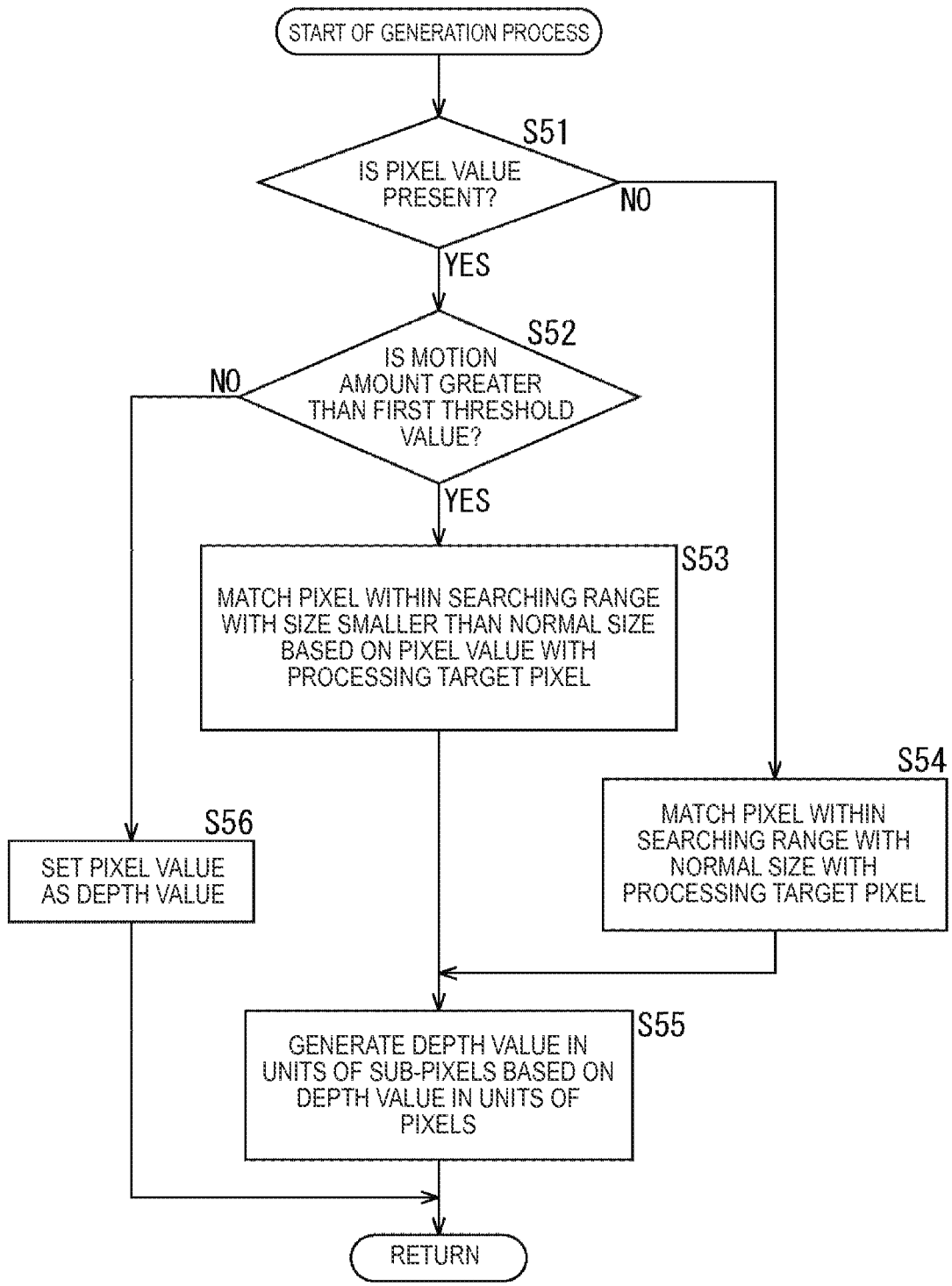
FIG. 7 is a flowchart for describing the generation process of the depth generation unit in FIG. 5.

FIG. 7 is a flowchart for describing the generation process of the depth generation unit 61 (FIG. 5) of the image processing device 60. The generation process is performed by setting each pixel of the image of the criterion viewpoint of the current frame as a processing target pixel.

Since processes of step S51 and step S52 of FIG. 7 are the same as the processes of step S31 and step S32 of FIG. 4, the description thereof will be omitted.

In step S53, the depth generation unit 61 matches a pixel within the searching range with a size smaller than the normal size, based on the pixel value of a processing target pixel in the units of sub-pixels in the predicted depth image, in the image of the neighboring viewpoint with the processing target pixel. Then, the depth generation unit 61 generates the distance to the pixel which is the most similar to the processing target pixel within the searching range as the depth value, and then the process proceeds to step S55.

Conversely, when it is determined in step S51 that the pixel value is not present, that is, the processing target pixel is present within the occlusion region, the process proceeds to step S54. In step S54, the depth generation unit 61 matches the pixel of the image of the neighboring viewpoint within the searching range with the normal size with the processing target pixel. Then, the depth generation unit 61 generates the distance to the pixel which is the most similar to the processing target pixel within the searching range as the depth value, and then the process proceeds to step S55.

When the depth generation unit 61 determines in step S52 that the motion amount is equal to or less than the first threshold value, the depth generation unit 61 determines that the processing target pixel is the pixel of the region with no motion. Then, the process proceeds to step S56.

Since processes of step S55 and step S56 are the same as the processes of step S35 and step S36 of FIG. 4, the description thereof will be omitted.

As described above, the image processing device 60 restricts the searching range at the time of the generation of the depth value of the current frame in the units of pixels in the region with motion to the range with the size smaller than the normal size based on the predicted value. Accordingly, a calculation amount at the time of the generation of the depth value in the units of the pixels in the region with motion is reduced, and thus the depth image can be generated more rapidly.

<Third Embodiment>

(Example of Configuration of Image Processing Device of Third Embodiment to which the Present Disclosure is Applied)

Figure 8:
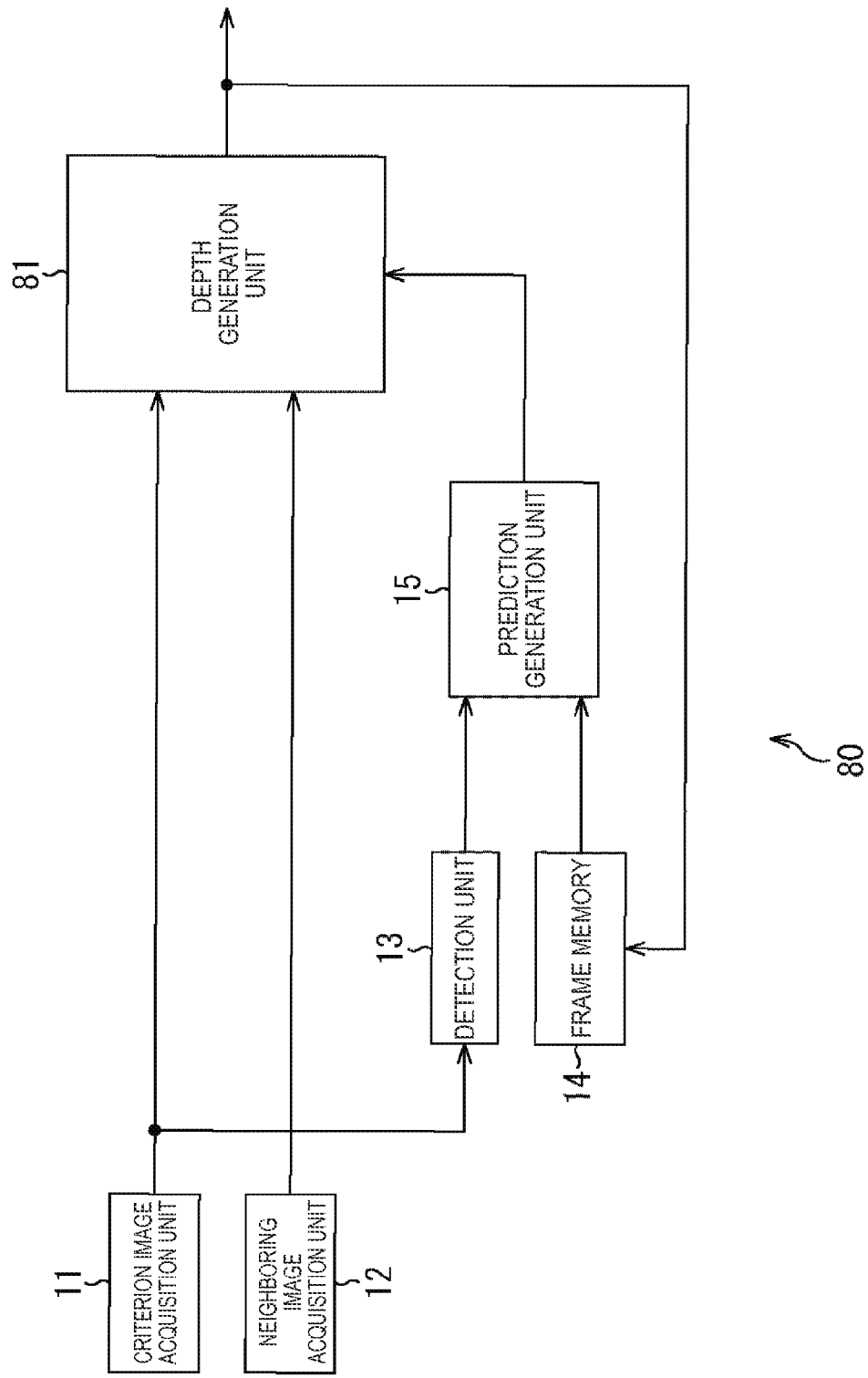
FIG. 8 is a block diagram illustrating an example of the configuration of an image processing device of a third embodiment to which the present disclosure is applied.

FIG. 8 is a block diagram illustrating an example of the configuration of an image processing device of a third embodiment to which the present disclosure is applied.

The same reference numerals are given to the constituent elements illustrated in FIG. 8 which are the same as those in FIG. 1. Repeated description will be properly omitted.

The configuration of an image processing device 80 in FIG. 8 is different from the configuration of the image processing device 10 in FIG. 1 in that a depth generation unit 81 is provided instead of the depth generation unit 16. The image processing device 80 restricts a searching range based on a depth value of a preceding frame only in a region with small motion.

Specifically, as in the depth generation unit 16, the depth generation unit 81 of the image processing device 80 divides a region other than the occlusion region of the image of the criterion viewpoint into a region with motion and a region with no motion based on the motion vector. The depth generation unit 81 further divides the region with motion into a region with small motion and a region with large motion based on the motion vector.

The depth generation unit 81 generates a depth value in the units of pixels by performing matching in the searching range with the normal size in the occlusion region and the region with large motion using the image of the criterion viewpoint and the image of the neighboring viewpoint.

The depth generation unit 81 extracts the pixel value of the region with small motion in the units of sub-pixels from the predicted depth image. The depth generation unit 81 sets, as a searching range of each pixel of the region with small motion, a range with a size smaller than the normal size of the image of the neighboring viewpoint based on the predicted value of the pixel. The depth generation unit 81 generates, as a depth value, a distance between each pixel of the region with small motion and the pixel which is the most similar to the pixel of the region with small motion within the searching range by performing matching of each pixel of the region with small motion with the pixel within the searching range.

The depth generation unit 81 generates a depth value in the units of sub-pixels through interpolation or the like based on the depth values of the occlusion region, the region with large motion, and the region with small motion in the units of pixels. As in the depth generation unit 16, the depth generation unit 81 extracts the pixel value of the region with no motion in the units of sub-pixels from the predicted depth image and sets this pixel value as a depth value of the region with no motion in the units of sub-pixels.

The depth generation unit 81 generates a depth image in which the depth values of the region with no motion, the occlusion region, the region with large motion, and the region with small motion in the units of sub-pixels obtained in the above-described manner are set as the pixel values of the sub-pixels as a depth image of the criterion viewpoint of the current frame. The depth generation unit 81 outputs the depth image of the criterion viewpoint of the current frame and supplies the depth image to the frame memory 14.

(Description of Process of Image Processing Device)

A depth image generation process of the image processing device 80 in FIG. 8 is the same as the depth image generation process in FIG. 3 except for a generation process of step S15. Thus, only the generation process will be described below.

Figure 9:
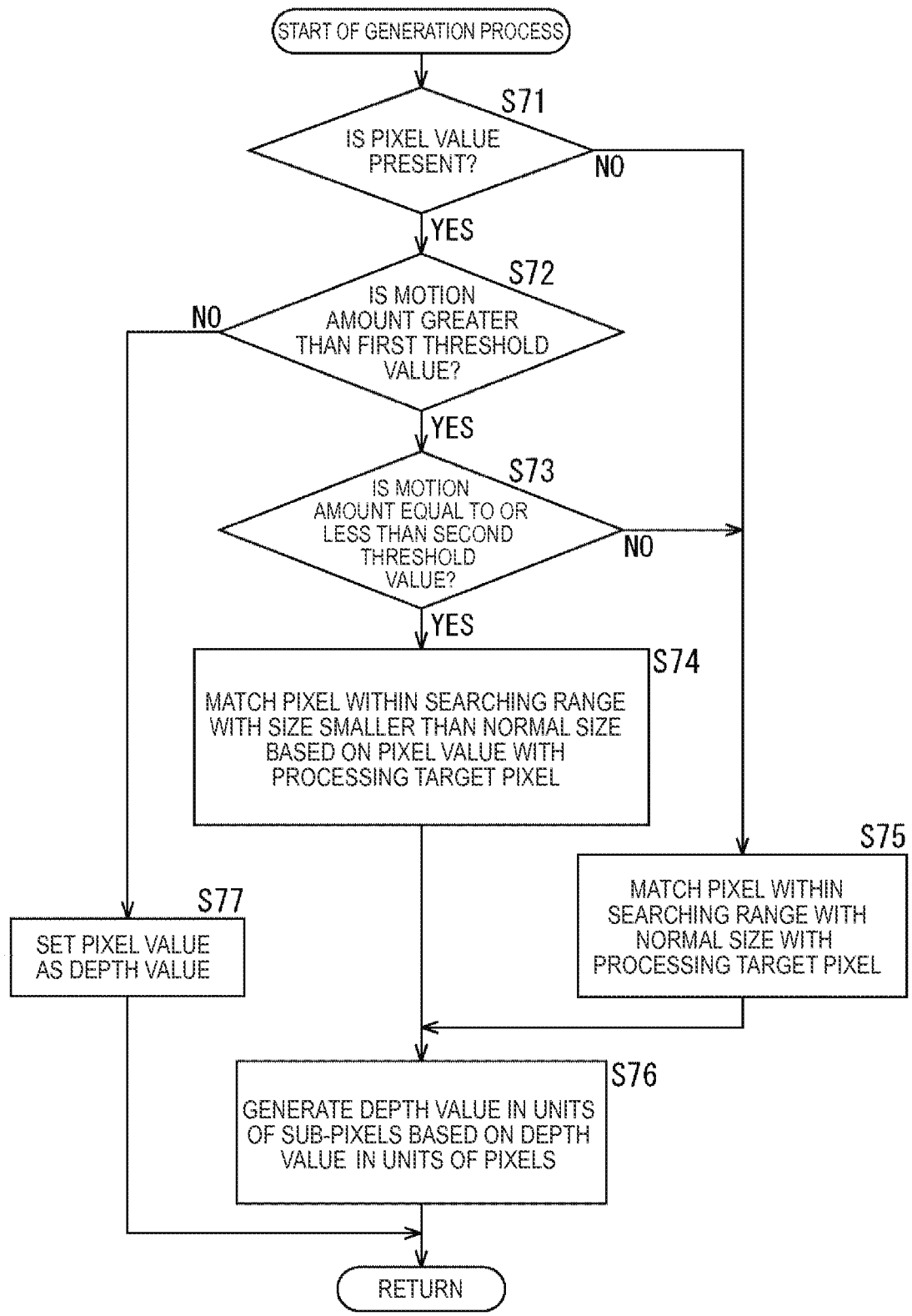
FIG. 9 is a flowchart for describing a generation process of a depth generation unit 81 in FIG. 8.

FIG. 9 is a flowchart for describing the generation process of the depth generation unit 81 (FIG. 8) of the image processing device 80. The generation process is performed by setting each pixel of the image of the criterion viewpoint of the current frame as a processing target pixel.

Since processes of step S71 and step S72 of FIG. 9 are the same as the processes of step S31 and step S32 of FIG. 4, the description thereof will be omitted.

When the depth generation unit 81 determines in step S72 that the motion amount is greater than a first threshold value, the depth generation unit 81 determines in step S73 whether the motion amount of the motion vector of the processing target pixel is equal to or less than a second threshold value greater than the first threshold value. When the depth generation unit 81 determines in step S73 that the motion amount is equal to or less than the second threshold value, that is, the motion amount is greater than the first threshold value and is equal to or less than the second threshold value, the depth generation unit 81 determines that the processing target pixel is a pixel in the region with small motion. Then, the process proceeds to step S74.

Conversely, when the depth generation unit 81 determines in step S73 that the motion amount is not equal to or less than the second threshold value, that is, the motion amount is greater than the second threshold value, the depth generation unit 81 determines that the processing target pixel is a pixel of the region with large motion. Then, the process proceeds to step S75.

Since processes of step S74 and step S77 are the same as the processes of step S53 and step S56 of FIG. 7, the description thereof will be omitted.

As described above, the image processing device 80 restricts the searching range to the range with the size smaller than the normal size based on a predicted value only in the region with small motion and with high reliability of the predicted value between the regions with motion. Accordingly, it is possible to improve precision of the depth image more than in the image processing device 60.

(Another Example of Size of Searching Range)

The sizes of the restricted searching ranges in the second and third embodiments may be fixed or may be variable. When the sizes of the restricted searching ranges are variable, the sizes are set according to, for example, the motion amount.

Figure 10:
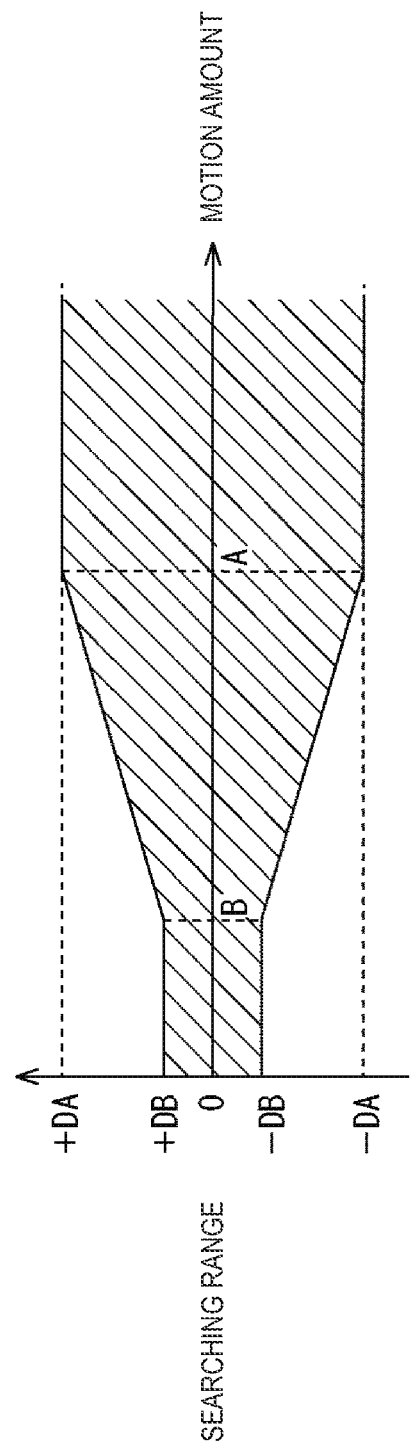
FIG. 10 is a diagram illustrating an example of a relation between a motion amount and the size of a searching range.

FIG. 10 is a diagram illustrating an example of a relation between the motion amount and the size of the searching range in this case.

In FIG. 10, the horizontal axis of the graph represents the motion amount and the vertical axis represents a position in the horizontal and vertical directions of the searching range when the center of the searching range is set to 0.

In the example of FIG. 10, when the motion amount is equal to or greater than 0 and is less than B, the length of the searching range in the horizontal direction and the vertical direction is 2 DB. Further, when the motion amount is equal to or greater than B and is less than A, the length of the searching range in the horizontal direction and the vertical direction becomes greater than 2 DB in proportion to the motion amount. When the motion amount is A, the length of the searching range is 2DA. When the motion amount is greater than A, the length of the searching range in the horizontal direction and the vertical direction is 2DA.

<Fourth Embodiment>
(Example of Configuration of Image Processing Device of Fourth Embodiment to which the Present Disclosure is Applied)

Figure 11:
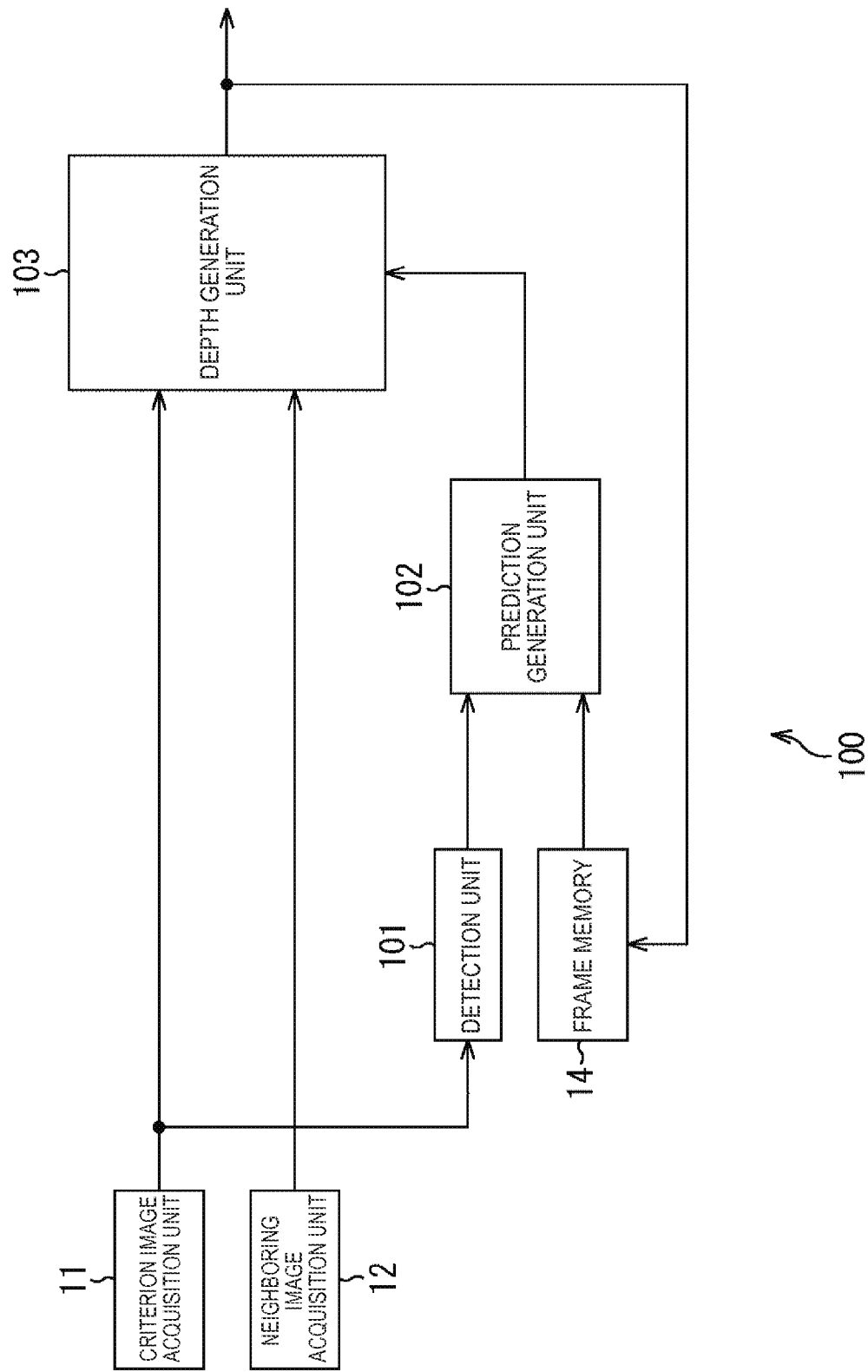
FIG. 11 is a block diagram illustrating an example of the configuration of an image processing device of a fourth embodiment to which the present disclosure is applied.

FIG. 11 is a block diagram illustrating an example of the configuration of an image processing device of a fourth embodiment to which the present disclosure is applied.

The same reference numerals are given to the constituent elements illustrated in FIG. 11 which are the same as those in FIG. 1. Repeated description will be properly omitted.

The configuration of an image processing device 100 in FIG. 11 is different from the configuration of the image processing device 10 in FIG. 1 in that a detection unit 101, a prediction generation unit 102, and a depth generation unit 103 are provided instead of the detection unit 13, the prediction generation unit 15, and the depth generation unit 16. The image processing device 100 determines a generation frequency of a depth value based on a difference which is information indicating a change in the image of the criterion viewpoint between frames.

Specifically, the detection unit 101 retains the image of the criterion viewpoint of the current frame supplied from the criterion image acquisition unit 11. The detection unit 101 detects a difference between the retained image of the criterion viewpoint of the preceding frame and the image of the criterion viewpoint of the current frame in the units of pixels and supplies the difference to the prediction generation unit 102.

Based on the difference supplied from the detection unit 101, the prediction generation unit 102 sets an updating flag indicating updating (generation) of the depth value to be negative or positive for each pixel of the image of the criterion viewpoint. The prediction generation unit 102 supplies the depth image of the preceding frame supplied from the frame memory 14 as the predicted depth image to the depth generation unit 103 and supplies the updating flag of each pixel to the depth generation unit 103.

Based on the updating flag supplied from the prediction generation unit 102, the depth generation unit 103 counts the number of times the updating flag of each pixel continues to be negative. The depth generation unit 103 generates the depth value of the pixel of which the updating flag is positive in the units of pixels based on the image of the criterion viewpoint from the criterion image acquisition unit 11 and the image of the neighboring viewpoint from the neighboring image acquisition unit 12.

The depth generation unit 103 generates the depth value of the pixel of which the updating flag is negative and for which the number of times the updating flag continues to be negative is a predetermined number of times (herein, 10 times) in the units of pixels based on the image of the criterion viewpoint and the image of the neighboring viewpoint. The depth generation unit 103 generates a depth value in the units of sub-pixels through interpolation or the like based on the generated depth value in the units of pixels.

The depth generation unit 103 sets the pixel value of the predicted depth image in the units of sub-pixels as a depth value of a pixel of which the updating flag is negative and for which the number of times the updating flag continues to be negative is not the predetermined number of times in the units of sub-pixels.

The depth generation unit 103 generates the depth image in which the depth value of each pixel of the image of the criterion viewpoint in the units of sub-pixels obtained in the above-described manner is set as the pixel value of each sub-pixel, as the depth image of the criterion viewpoint of the current frame. The depth generation unit 103 outputs the depth image of the criterion viewpoint of the current frame and supplies the depth image to the frame memory 14.

(Example of Difference)

Figure 12:
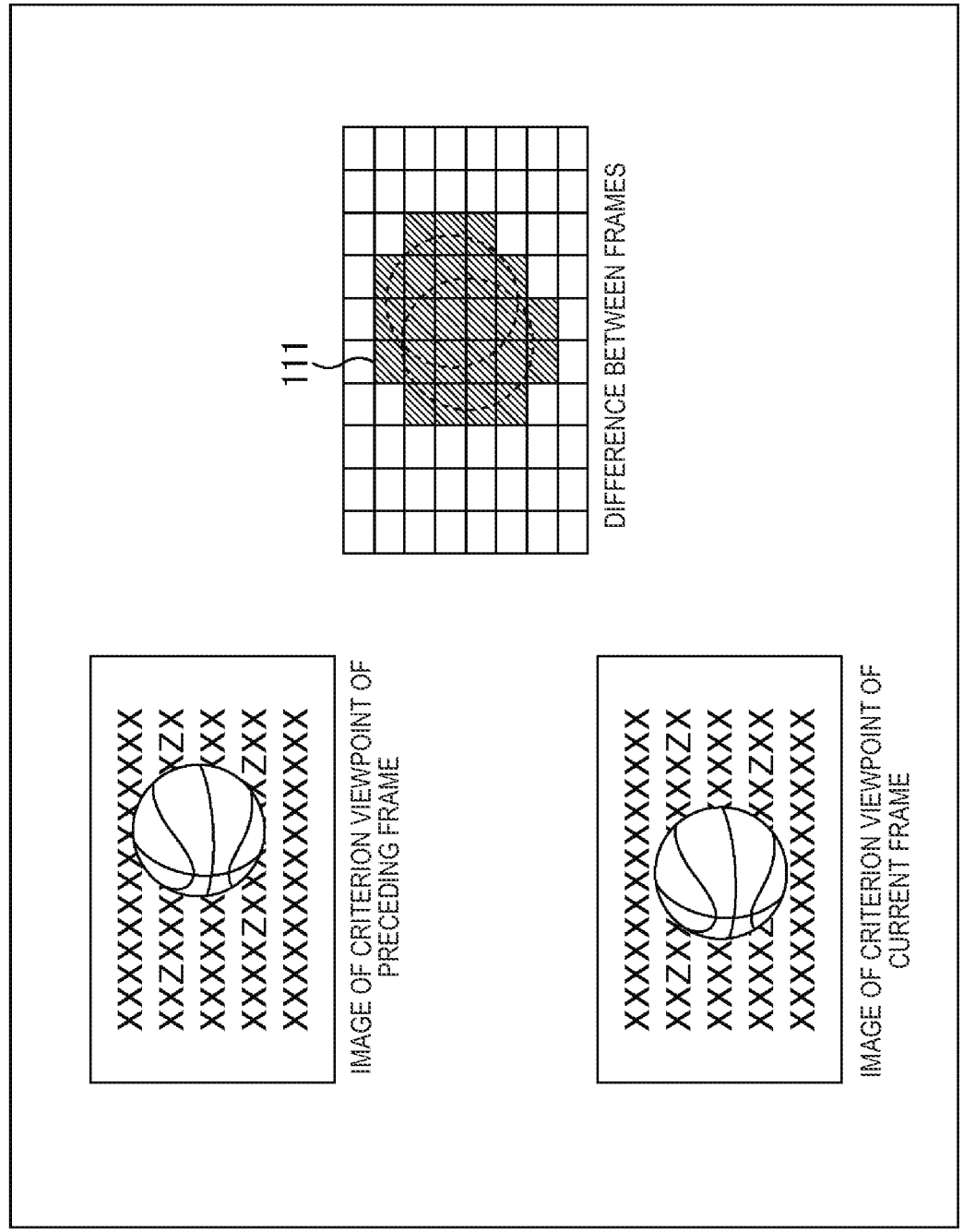
FIG. 12 is a diagram illustrating an example of a difference in an image between criterion viewpoints of a preceding frame and a current frame.

FIG. 12 is a diagram illustrating an example of a difference between the images of the criterion viewpoint of the preceding frame and the current frame.

In the example of FIG. 12, the images of the criterion viewpoint are images in which letters are a background and a basketball is a foreground. The basketball is present on the upper right side of a screen in the preceding frame and is present in the middle of a screen in the current frame. That is, between the preceding frame and the current frame, the basketball is moved to the lower left side.

In this case, the difference between the images of the criterion viewpoint of the preceding frame and the current frame is increased to a region 111 of the basketball of the preceding frame and the current frame indicated by diagonal lines in FIG. 12. Also, a small rectangle on the right side of FIG. 12 indicates a pixel.

(Example of Generation Frequency of Depth Value)

Figure 13:
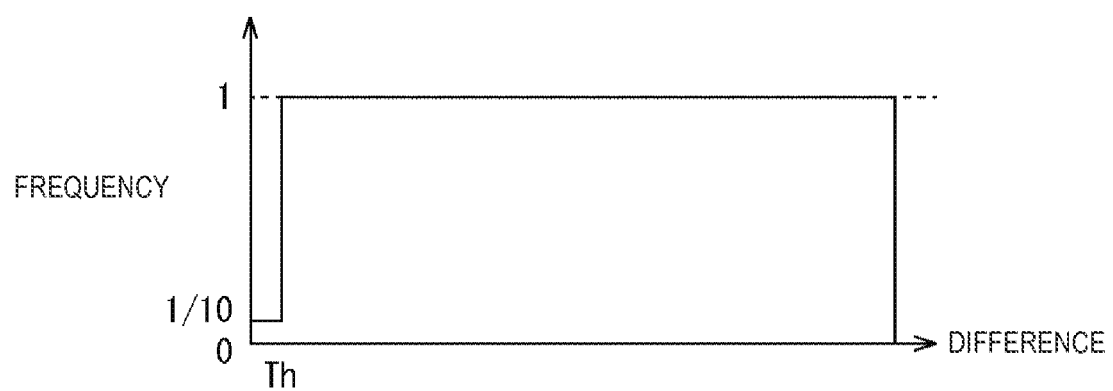
FIG. 13 is a diagram illustrating an example of a generation frequency of a depth value.

FIG. 13 is a diagram illustrating an example of a generation frequency of the depth value.

In FIG. 13, the horizontal axis of the graph represents the difference between the images of the criterion viewpoint of the preceding frame and the current frame and the vertical axis represents the generation frequency of the depth value when the frequency of one frame is 1.

In the example of FIG. 13, when the difference is equal to or greater than 0 and is equal to or less than a threshold value Th, the generation frequency of the depth value is 1/10. When the difference is greater than the threshold value Th, the generation frequency of the depth value is 1. That is, when the difference is equal to or greater than 0 and is equal to or less than the threshold value Th, the depth value of the preceding frame is considered to be the depth value of the current frame at a ratio of 9 times to 10 frames. When the difference is greater than the threshold value Th, the depth value of the preceding frame is not used in each frame.

(Description of Process of Image Processing Device)

Figure 14:
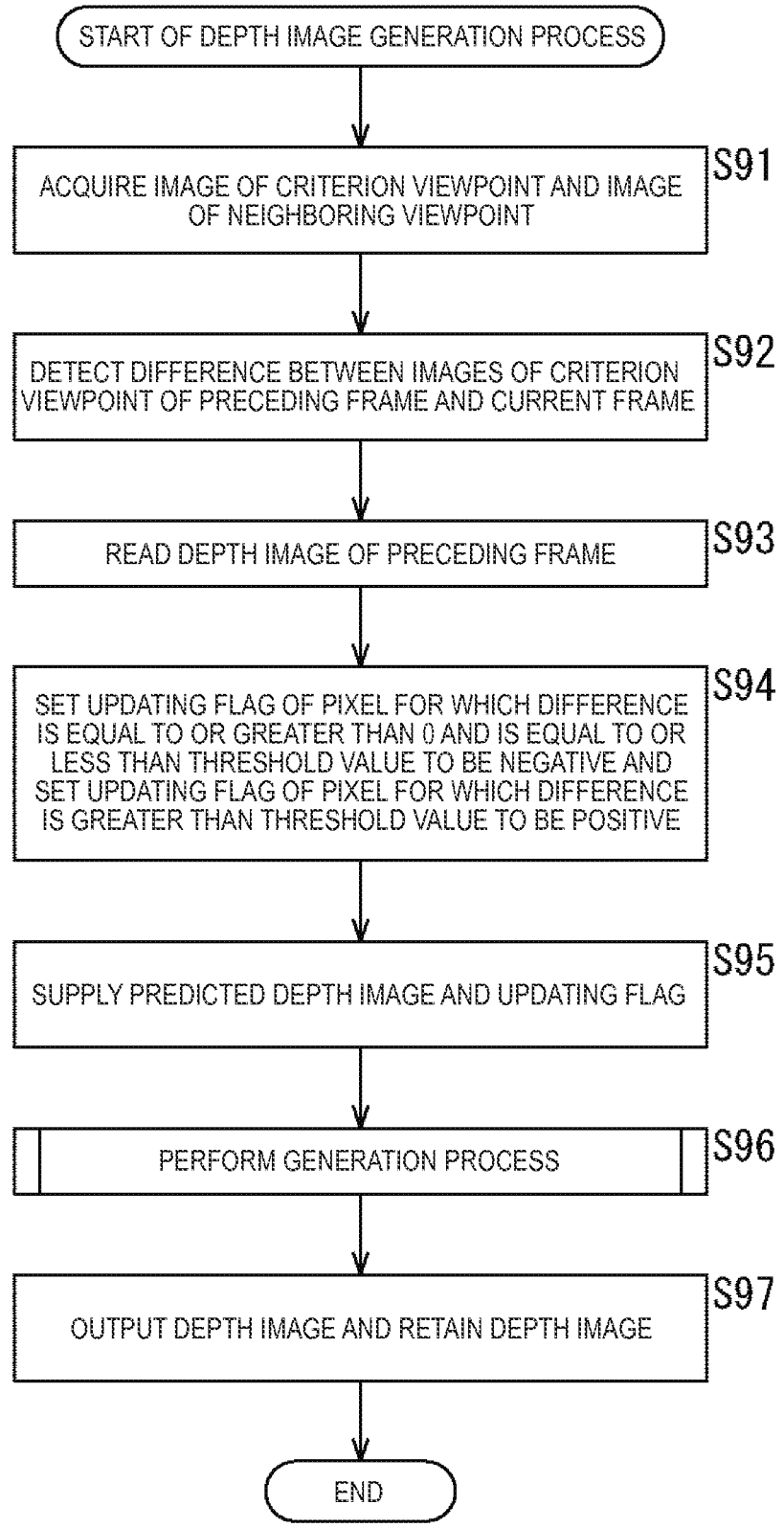
FIG. 14 is a flowchart for describing a depth image generation process of an image processing device in FIG. 11.

FIG. 14 is a flowchart for describing a depth image generation process of the image processing device 100 in FIG. 11.

In step S91 of FIG. 14, the criterion image acquisition unit 11 of the image processing device 100 acquires the image of the criterion viewpoint of the current frame and the neighboring image acquisition unit 12 acquires the image of the neighboring viewpoint of the current frame. The criterion image acquisition unit 11 supplies the image of the criterion viewpoint of the current frame to the detection unit 101 and retains the image of the criterion viewpoint, and supplies the image of the criterion viewpoint of the current frame to the depth generation unit 103. The neighboring image acquisition unit 12 supplies the image of the neighboring viewpoint of the current frame to the depth generation unit 103.

In step S92, the detection unit 101 detects the difference between the retained image of the criterion viewpoint of the preceding frame and the image of the criterion viewpoint of the current frame in the units of pixels and supplies the difference to the prediction generation unit 102.

In step S93, the frame memory 14 reads the retained depth image of the criterion viewpoint of the preceding frame in the units of sub-pixels and supplies this depth image to the prediction generation unit 102.

In step S94, the prediction generation unit 102 sets the updating flag of the pixel for which the difference supplied from the detection unit 101 is equal to or greater than 0 and is equal to or less than the threshold value Th to be negative and sets the updating flag of the pixel for which the difference is greater than the threshold value Th to be positive.

In step S95, the prediction generation unit 102 supplies the depth image of the preceding frame supplied from the frame memory 14 as the predicted depth image to the depth generation unit 103 and supplies the updating flag of each pixel to the depth generation unit 103.

In step S96, the depth generation unit 103 performs the generation process of generating the depth image of the criterion viewpoint of the current frame based on the predicted depth image. The details of the generation process will be described with reference to FIG. 15 to be described below.

In step S97, the depth generation unit 103 outputs the depth image of the criterion viewpoint of the current frame generated through the generation process, and supplies this depth image to the frame memory 14 and retains this depth image. Then, the process ends.

Figure 15:
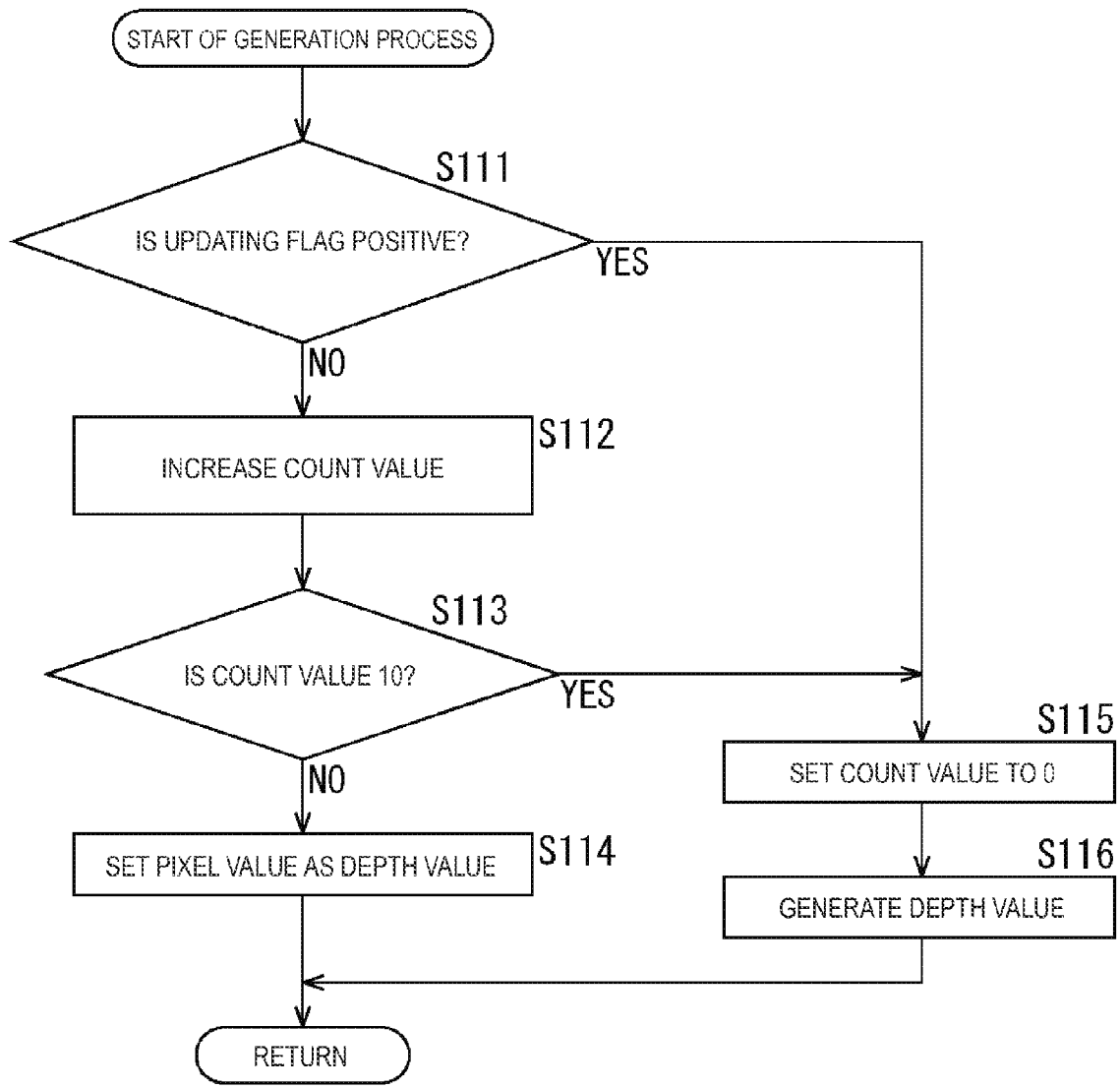
FIG. 15 is a flowchart for describing details of a generation process of FIG. 14.

FIG. 15 is a flowchart for describing the details of the generation process of step S96 of FIG. 14. The generation process is performed by setting each pixel of the image of the criterion viewpoint of the current frame as the processing target pixel.

In step S111 of FIG. 15, the depth generation unit 103 determines whether the updating flag of the processing target pixel is positive. When it is determined in step S111 that the updating flag is not positive, that is, the updating flag is negative, the process proceeds to step S112.

In step S112, the depth generation unit 103 increases a count value of the number of times the updating flag continues to be negative only by one. The initial value of the count value is 0.

In step S113, the depth generation unit 103 determines whether the count value is 10. When it is determined in step S113 that the count value is not 10, that is, it is determined that the updating flag continues not to be negative 10 times, the process proceeds to step S114.

In step S114, the depth generation unit 103 extracts the pixel value of the processing target pixel in the units of sub-pixels from the predicted depth image supplied from the prediction generation unit 102 and sets this pixel value as the depth value. Then, the process returns to step S96 of FIG. 14 and the process proceeds to step S97.

Conversely, when it is determined in step S111 that the updating flag is positive or it is determined in step S113 that the count value is 10, the depth generation unit 103 changes the count value to 0 in step S115.

In step S116, the depth generation unit 103 generates the depth value of the processing target pixel in the units of pixels based on the image of the criterion viewpoint from the criterion image acquisition unit 11 and the image of the neighboring viewpoint from the neighboring image acquisition unit 12. Then, the depth generation unit 103 generates a depth value in the units of sub-pixels based on the depth value of the processing target pixel in the units of pixels. Then, the process returns to step S96 of FIG. 14 and the process proceeds to step S97.

As described above, the image processing device 100 generates the depth value of the preceding frame in the region for which the difference is small as the depth value of the current frame based on the image of the current frame and the image of the preceding frame. Accordingly, it is not necessary to generate the depth value in the region for which the difference is small and the depth image can be generated rapidly.

Since the image processing device 100 generates the depth value at the frequency less than that of the region in which the difference is large even in the region in which the difference is small, the precision of the depth image can be improved.

The generation frequency of the depth value of the region for which the difference is small is not limited to 1 time per 10 frames, as described above. Further, the generation frequency of the depth value for which the difference is large is not limited to each frame, as described above.

<Conclusion of First to Fourth Embodiments>

FIG. 16 is a diagram illustrating a summary table of the processes of the first to fourth embodiments.

As illustrated in FIG. 16, in the first to third embodiments, the process is different between the occlusion region and the region other than the occlusion region. Further, in the region other than the occlusion region, the process is different between the region with no motion and the region with motion. In the third embodiment, in the regions with motion, the process is different between the region with small motion and the region with large motion.

Specifically, in the first embodiment, the depth value of the preceding frame in the units of sub-pixels is used as the depth value of the current frame in the units of sub-pixels in the region with no motion in the region other than the occlusion region. On the other hand, in the region with motion, the depth value of the current frame in the units of pixels is generated from the depth value of the preceding frame in the units of sub-pixels and the depth value in the units of sub-pixels is generated based on the depth value in the units of pixels.

In the occlusion region, the depth value of the current frame in the units of pixels is generated by the matching and the depth value in the units of sub-pixels is generated based on the depth value in the units of pixels.

In the second embodiment, the region with no motion in the region other than the occlusion region, as in the first embodiment, the depth value of the preceding frame in the units of sub-pixels is used as the depth value of the current frame in the units of sub-pixels. On the other hand, in the region with motion, the searching range with the size smaller than the normal size is set based on the depth value of the preceding frame in the units of sub-pixels, and the matching is performed in the searching range. Then, the depth value in the units of sub-pixels is generated based on the depth value in the units of pixels obtained as the matching result.

In the occlusion region, the depth value of the current frame in the units of pixels is generated by the matching in the searching range with the normal size and the depth value in the units of sub-pixels is generated based on the depth value in the units of pixels.

In the third embodiment, in the region with no motion in the region other than the occlusion region, as in the first embodiment, the depth value of the preceding frame in the units of sub-pixels is used as the depth value of the current frame in the units of sub-pixels. On the other hand, in the region that is the region with motion and is the region with small motion, as in the case of the region with motion of the second embodiment, the depth value in the units of sub-pixels is generated in the searching range with the size smaller than the normal size.

In the region which is the region with motion and is the region with large motion and the occlusion region, as in the case of the occlusion region of the second embodiment, the depth value in the units of sub-pixels is generated in the searching range with the normal size.

In the fourth embodiment, the process is different in the regions in which the difference between the images of the criterion viewpoint of the preceding frame and the current frame is large and small.

Specifically, in the region in which the difference is large, the depth value in the units of sub-pixels is generated at each frame. On the other hand, in the region in which the difference is small, the depth value in the units of sub-pixels is generated once every 10 frames.

<Fifth Embodiment>

(Example of Configuration of Encoding Device of Embodiment to which the Present Disclosure is Applied)

Figure 17:
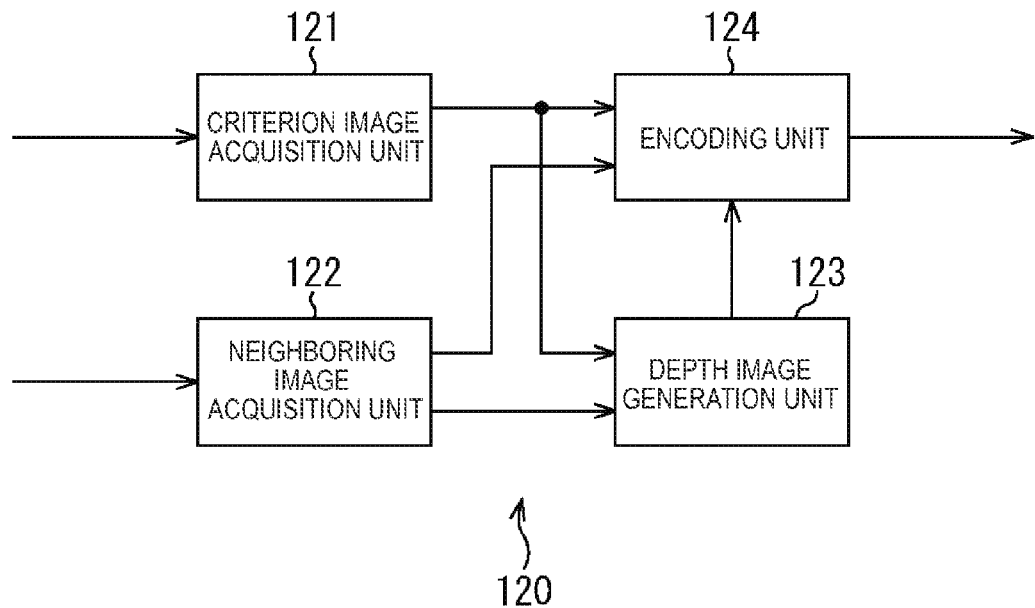
FIG. 17 is a block diagram illustrating an example of the configuration of an encoding device of an embodiment to which the present disclosure is applied.

FIG. 17 is a block diagram illustrating an example of the configuration of an encoding device of an embodiment to which the present disclosure is applied.

An encoding device 120 in FIG. 17 includes a criterion image acquisition unit 121, a neighboring image acquisition unit 122, a depth image generation unit 123, and an encoding unit 124. The encoding device 120 encodes the image of the criterion viewpoint, the image of the neighboring viewpoint, and the depth image of the criterion viewpoint.

The criterion image acquisition unit 121 of the encoding device 120 acquires an image of a criterion viewpoint captured by an external imaging device (not illustrated) and supplies the image of the criterion viewpoint to the depth image generation unit 123 and the encoding unit 124.

The neighboring image acquisition unit 122 acquires an image of a neighboring viewpoint captured by an external imaging device (not illustrated) and supplies the image of the neighboring viewpoint to the depth image generation unit 123 and the encoding unit 124.

The depth image generation unit 123 is configured by one of the above-described image processing devices according to the first to fourth embodiments. The depth image generation unit 123 generates a depth image of the criterion viewpoint based on the image of the criterion viewpoint from the criterion image acquisition unit 121 and the image of the neighboring viewpoint from the neighboring image acquisition unit 122 and supplies the depth image of the criterion viewpoint to the encoding unit 124.

The encoding unit 124 encodes the image of the criterion viewpoint from the criterion image acquisition unit 121, the image of the neighboring viewpoint from the neighboring image acquisition unit 122, and the depth image from the depth image generation unit 123. As a scheme of encoding the depth image, an Advanced Video Coding (AVC) scheme, a Multiview Video Coding (MVC) scheme, a High Efficiency Video Coding (HEVC) scheme, or the like can be used. The encoding unit 124 transmits an encoded stream obtained as the encoding result.

(Example of Configuration of Decoding Device According to Embodiment)

Figure 18:
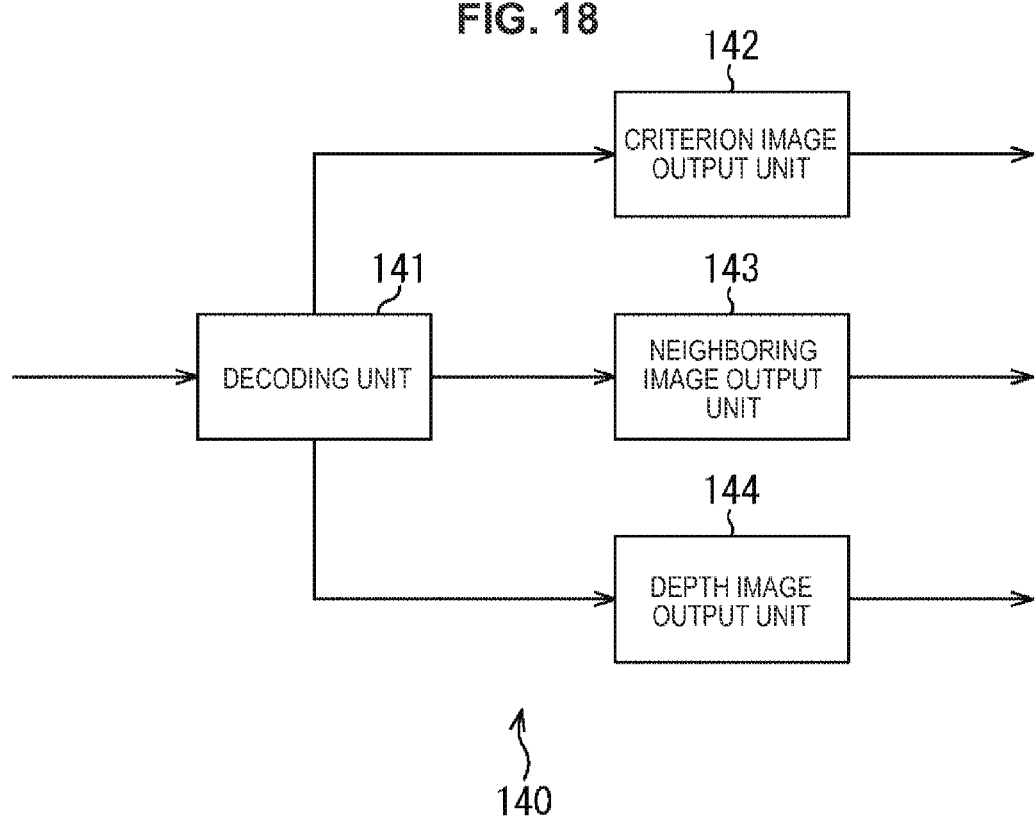
FIG. 18 is a block diagram illustrating an example of the configuration of a decoding device of an embodiment.

FIG. 18 is a block diagram illustrating an example of the configuration of a decoding device decoding the encoded stream generated by the encoding device 120 in FIG. 17 according to an embodiment.

A decoding device 140 in FIG. 18 includes a decoding unit 141, a criterion image output unit 142, a neighboring image output unit 143, and a depth image output unit 144.

The decoding unit 141 of the decoding device 140 acquires the encoded stream transmitted from the encoding device 120. The decoding unit 141 decodes the encoded stream according to a scheme corresponding to the encoding scheme of the encoding device 120 to generate the image of the criterion viewpoint, the image of the neighboring viewpoint, and the depth image of the criterion viewpoint. The decoding unit 141 supplies the image of the criterion viewpoint to the criterion image output unit 142, supplies the image of the neighboring viewpoint to the neighboring image output unit 143, and supplies the depth image of the criterion viewpoint to the depth image output unit 144.

The criterion image output unit 142 outputs the image of the criterion viewpoint supplied from the decoding unit 141.

The neighboring image output unit 143 outputs the image of the neighboring viewpoint supplied from the decoding unit 141. The depth image output unit 144 outputs the depth image supplied from the decoding unit 141.

<Sixth Embodiment>

(Configuration Example of Computer to which Present Disclosure is Applied)

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 19 is a block diagram showing an example configuration of the hardware of a computer that executes the series of processes described earlier according to a program.

In the computer, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 is configured from a display, a speaker or the like. The storage unit 208 is configured from a hard disk, a non-volatile memory or the like. The communication unit 209 is configured from a network interface or the like. The drive 210 drives a removable medium 211 such as a magnetic disk, an optical disk, a magneto-optical disk, a semiconductor memory or the like.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer (the CPU 201) are provided being recorded in the removable medium 211 which is a packaged medium or the like. Also, programs may be provided via a wired or wireless transmission medium, such as a local area network, the Internet or digital satellite broadcasting.

In the computer, by loading the removable recording medium 211 into the drive 210, the program can be installed into the storage unit 416 via the input/output interface 205. It is also possible to receive the program from a wired or wireless transfer medium using the communication unit 209 and install the program into the storage unit 416. As another alternative, the program can be installed in advance into the ROM 202 or the storage unit 416.

It should be noted that the program executed by a computer may be a program that is processed in time series according to the sequence described in this specification or a program that is processed in parallel or at necessary timing such as upon calling.

An embodiment of the disclosure is not limited to the embodiments described above, and various changes and modifications may be made without departing from the scope of the disclosure.

For example, in the second to fourth embodiments, the depth value may not be generated in the units of sub-pixels, but may be generated in the units of pixels.

In the first to third embodiments, the division of the region based on the motion vector is performed by the depth generation unit 16 (61 and 81), but the division of the region may be performed by the prediction generation unit 15.

In this case, the prediction generation unit 15 supplies the depth generation units 16 and 61 with a flag indicating whether the depth value set for each pixel is generated, that is, a flag indicating whether a region is a region with motion. Further, the prediction generation unit 15 supplies the depth generation unit 81 with a flag indicating whether the depth value set for each pixel is generated and indicating whether a searching range is restricted. That is, the depth generation unit 81 supplies the prediction generation unit 15 with a flag indicating in which region a pixel is present among the region with no motion, the region with large motion, and the region with small motion.

In the first to third embodiments, the region is divided based on the motion vector of the current frame, but the region may be divided based on a history of the motion vector.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below:

(1) An image processing device including:
a depth generation unit configured to generate, based on an image of a current frame and an image of a preceding frame of the current frame, a depth image indicating a position of a subject in a depth direction in the image of the preceding frame as a depth image of the current frame.

(2) The image processing device according to (1), wherein the depth generation unit generates the depth image based on a change between the image of the current frame and the image of the preceding frame.

(3) The image processing device according to (2), further including:
a detection unit configured to detect a motion vector of the image of the current frame based on the image of the current frame and the image of the preceding frame,
wherein the depth generation unit generates the depth image of the preceding frame as the depth image of the current frame based on the motion vector detected by the detection unit.

(4) The image processing device according to (3), wherein the depth generation unit generates the depth image of the preceding frame as the depth image of the current frame when a motion amount of the motion vector is equal to or less than a first threshold value.

(5) The image processing device according to (4), wherein the depth generation unit generates the depth image of the current frame based on the depth image of the preceding frame when the motion amount of the motion vector is greater than the first threshold value.

(6) The image processing device according to (5), wherein, when the motion amount of the motion vector is greater than the first threshold value, the depth generation unit generates the depth image of the current frame in units of pixels based on the depth image of the preceding frame in units of sub-pixels and generates the depth image of the current frame in the units of sub-pixels based on the depth image of the current frame in the units of pixels.

(7) The image processing device according to (5), wherein, when the motion amount of the motion vector is greater than the first threshold value, the depth generation unit generates the depth image of the current frame by performing matching in a restricted searching range based on the depth image of the preceding frame.

(8) The image processing device according to (7), wherein, when the motion amount of the motion vector is greater than the first threshold value and is equal to or less than a second threshold value, the depth generation unit generates the depth image of the current frame by performing the matching in the restricted searching range based on the depth image of the preceding frame.

(9) The image processing device according to (7) or (8), wherein a size of the searching range is a size according to the motion amount.

(10) The image processing device according to (1) or (2), further including:
a detection unit configured to detect a difference between the image of the current frame and the image of the preceding frame,
wherein, when the difference detected by the detection unit is equal to or less than a threshold value, the depth generation unit generates the depth image of the current frame according to a frequency at which the depth image of the image of the preceding frame is generated as the depth image of the current frame.

(11) The image processing device according to (10), wherein, when the difference detected by the detection unit is greater than the threshold value, the depth generation unit generates the depth image of the current frame according to a frequency less than the frequency at which the depth image of the image of the preceding frame is generated as the depth image of the current frame.

(12) The image processing device according to any of (1) to (11), further including:
an encoding unit configured to encode the depth image generated by the depth generation unit.

(13) An image processing method including, by an image processing device:
generating, based on an image of a current frame and an image of a preceding frame of the current frame, a depth image indicating a position of a subject in a depth direction in the image of the preceding frame as a depth image of the current frame.

What is claimed is:

1. An image processing device comprising:
a central processing unit (CPU) configured to:
generate, based on an image of a current frame and an image of a preceding frame of the current frame, a first depth image indicating a position of a subject in a depth direction in the image of the preceding frame as a second depth image of the current frame,
wherein a difference is detected between the image of the current frame and the image of the preceding frame, and
wherein the second depth image is generated according to a frequency less than the frequency at which the first depth image of the preceding frame is determined, when the difference between the image of the current frame and the image of the preceding frame is equal to or less than a threshold value, and wherein the second depth image is generated according to a frequency that is the same as the frequency at which the first depth image of the preceding frame is determined, when the difference between the image of the current frame and the image of the preceding frame is greater than the threshold value.

2. The image processing device according to claim 1, wherein the CPU is further configured to:
   detect a motion vector of the image of the current frame based on the image of the current frame and the image of the preceding frame, and
   generate the first depth image of the preceding frame as the second depth image of the current frame based on the detected motion vector.

3. The image processing device according to claim 2, wherein the CPU is configured to generate the first depth image of the preceding frame as the second depth image of the current frame, when a motion amount of the motion vector is equal to or less than a first threshold value.

4. The image processing device according to claim 3, wherein the CPU is configured to generate the second depth image of the current frame based on the first depth image of the preceding frame, when the motion amount of the motion vector is greater than the first threshold value.

5. The image processing device according to claim 4, wherein, when the motion amount of the motion vector is greater than the first threshold value, the CPU is configured to generate the second depth image of the current frame in units of pixels based on the first depth image of the preceding frame in units of sub-pixels and generate the second depth image of the current frame in the units of sub-pixels based on the second depth image of the current frame in the units of pixels.

6. The image processing device according to claim 4, wherein, when the motion amount of the motion vector is greater than the first threshold value, the CPU is configured to generate the second depth image of the current frame by performing matching in a restricted searching range based on the first depth image of the preceding frame.

7. The image processing device according to claim 6, wherein, when the motion amount of the motion vector is greater than the first threshold value and is equal to or less than a second threshold value, the CPU is configured to generate the second depth image of the current frame by performing the matching in the restricted searching range based on the first depth image of the preceding frame.

8. The image processing device according to claim 6, wherein a size of the searching range is a size according to the motion amount.

9. The image processing device according to claim 1, further comprising:
   an encoding device configured to encode at least the second depth image generated by the CPU.

10. The image processing device according to claim 1, wherein the CPU is configured to generate the second depth image of the current frame in units of pixels based on the first depth image of the preceding frame in units of sub-pixels when a motion amount of a motion vector is greater than a threshold value, and
    wherein the motion vector is detected based on the image of the current frame and the image of the preceding frame.

11. The image processing device according to claim 1, wherein the CPU is configured to generate the second depth image of the current frame by performing matching in a restricted searching range based on the first depth image of the preceding frame when a motion amount of a motion vector is greater than a threshold value, and
    wherein the motion vector is detected based on the image of the current frame and the image of the preceding frame.

12. An image processing method comprising:
    generating, based on an image of a current frame and an image of a preceding frame of the current frame, a first depth image indicating a position of a subject in a depth direction in the image of the preceding frame as a second depth image of the current frame,
    detecting a difference between the image of the current frame and the image of the preceding frame, and
    generating a second depth image according to a frequency less than the frequency at which the first depth image of the preceding frame is determined, when the difference between the image of the current frame and the image of the preceding frame is equal to or less than a threshold value, and
    generating a second depth image according to a frequency that is the same as the frequency at which the first depth image of the preceding frame is determined, when the difference between the image of the current frame and the image of the preceding frame is greater than the threshold value.

13. An image processing device comprising:
    a central processing unit (CPU) configured to:
    generate, based on a change between an image of a current frame and an image of a preceding frame, a first depth image indicating a position of a subject in a depth direction in the image of the preceding frame as a second depth image of the current frame,
    wherein the first depth image of the preceding frame is generated as the second depth image of the current frame when a motion amount of a motion vector is equal to or less than a first threshold value, and
    wherein the second depth image of the current frame is generated by performing matching in a restricted searching range based on the first depth image of the preceding frame when the motion amount of the motion vector is greater than the first threshold value, and
    wherein the motion vector is detected based on the image of the current frame and the image of the preceding frame.

* * * * *